US012489202B2

(12) United States Patent
Gibson et al.

(10) Patent No.: US 12,489,202 B2
(45) Date of Patent: Dec. 2, 2025

(54) NOZZLE CAP ENCAPSULATED ANTENNA SYSTEM

(71) Applicant: Mueller International, LLC, Atlanta, GA (US)

(72) Inventors: Daryl Lee Gibson, Chattanooga, TN (US); William Mark O'Brien, Toronto (CA); Andrew Wallace, Richmond Hill (CA); David James Carlos Dunn, Limehouse (CA); Spencer L. Webb, Windham, NH (US); Lian Jie Zhao, North York (CA); Igor Gorban, Oakville (CA); Mohammad Hassan Sobhani, Burlington (CA)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 17/683,127

(22) Filed: Feb. 28, 2022

(65) Prior Publication Data

US 2022/0320721 A1 Oct. 6, 2022

Related U.S. Application Data

(63) Continuation of application No. 16/234,715, filed on Dec. 28, 2018, now Pat. No. 11,342,656.

(51) Int. Cl.

*H01Q 1/38* (2006.01)
*E03B 9/02* (2006.01)
(Continued)

(52) U.S. Cl.

CPC ................. *H01Q 1/38* (2013.01); *E03B 9/02* (2013.01); *H01Q 1/44* (2013.01); *H01Q 5/35* (2015.01); *H01Q 21/0006* (2013.01); *H01Q 1/42* (2013.01)

(58) Field of Classification Search

CPC .. H01Q 1/38; H01Q 1/44; H01Q 5/35; H01Q 21/0006; H01Q 1/42; H01Q 7/00;
(Continued)

(56) References Cited

U.S. PATENT DOCUMENTS

| | | | |
|---|---|---|---|
| 1,738,094 | A | 12/1929 | Caldwell |
| 2,171,173 | A | 8/1939 | Coyer |

(Continued)

FOREIGN PATENT DOCUMENTS

| | | |
|---|---|---|
| AU | 2011265675 | 5/2015 |
| AU | 2015202550 | 11/2017 |

(Continued)

OTHER PUBLICATIONS

US 11,296,403 B2, 04/2022, Gibson et al. (withdrawn)

(Continued)

*Primary Examiner* — Dimary S Lopez Cruz
*Assistant Examiner* — Bamidele A Immanuel
(74) *Attorney, Agent, or Firm* — Taylor Duma LLP

(57) ABSTRACT

A method for manufacturing a nozzle cap, the method including attaching an antenna printed circuit board ("PCB") strip to an inner cover surface of an antenna cover; and inserting the antenna cover into a scallop defined by a circumferential wall of a cap body to position the antenna PCB strip between the antenna cover and the circumferential wall, the circumferential wall defining an outer wall surface, the antenna cover covering the scallop, the scallop extending radially inward into the circumferential wall relative to a first portion and a second portion of the outer wall surface, the scallop circumferentially positioned between the first portion and the second portion of the outer wall surface.

20 Claims, 10 Drawing Sheets

(51) Int. Cl.

| | |
|---|---|
| ***H01Q 1/44*** | (2006.01) |
| ***H01Q 5/35*** | (2015.01) |
| ***H01Q 21/00*** | (2006.01) |
| *H01Q 1/42* | (2006.01) |

(58) Field of Classification Search
CPC ........ H01Q 9/0442; H01Q 9/42; H01Q 1/241; E03B 9/02; E03B 9/04; E03B 9/06
See application file for complete search history.

(56) References Cited

U.S. PATENT DOCUMENTS 3,254,528 A 6/1966 Michael
3,592,967 A 7/1971 Harris
3,612,922 A 10/1971 Furnival
3,662,600 A 5/1972 Rosano, Jr. et al.
3,673,856 A 7/1972 Panigati
3,731,534 A 5/1973 Painley et al.
3,815,129 A 6/1974 Sweany
4,000,753 A * 1/1977 Ellis .......................... E03B 9/04 411/948
4,056,970 A 11/1977 Sollish
4,083,229 A 4/1978 Anway
4,333,028 A 6/1982 Panton
4,431,873 A 2/1984 Dunn et al.
4,462,249 A 7/1984 Adams
4,467,236 A 8/1984 Kolm et al.
4,543,817 A 10/1985 Sugiyama
4,638,314 A * 1/1987 Keller .................... G01R 21/00 340/870.19
4,763,686 A 8/1988 Laurel
4,796,466 A 1/1989 Farmer
4,827,969 A 5/1989 Lyasko
4,844,396 A 7/1989 Norton
4,893,679 A 1/1990 Martin et al.
4,930,358 A 6/1990 Motegi et al.
4,984,498 A 1/1991 Fishman
5,038,614 A 8/1991 Bseisu et al.
5,052,215 A 10/1991 Lewis
5,078,006 A 1/1992 Maresca et al.
5,085,082 A 2/1992 Cantor et al.
5,090,234 A 2/1992 Maresca et al.
5,117,676 A 6/1992 Chang
5,118,464 A 6/1992 Richardson et al.
5,163,314 A 11/1992 Maresca et al.
5,165,280 A 11/1992 Sternberg et al.
5,170,657 A 12/1992 Maresca et al.
5,174,155 A 12/1992 Sugimoto
5,184,851 A 2/1993 Sparling et al.
5,187,973 A 2/1993 Kunze et al.
5,189,904 A 3/1993 Maresca et al.
5,201,226 A 4/1993 John et al.
5,203,202 A 4/1993 Spencer
5,205,173 A 4/1993 Allen
5,209,125 A 5/1993 Kalinoski et al.
5,218,859 A 6/1993 Stenstrom et al.
5,243,862 A 9/1993 Latimer
5,254,944 A 10/1993 Holmes et al.
5,272,646 A 12/1993 Farmer
5,279,160 A 1/1994 Koch
5,287,884 A 2/1994 Cohen
5,298,894 A 3/1994 Cerny et al.
5,301,985 A 4/1994 Terzini
5,303,592 A 4/1994 Livingston
5,319,956 A 6/1994 Bogle et al.
5,333,501 A 8/1994 Okada et al.
5,335,547 A 8/1994 Nakajima et al.
5,343,737 A 9/1994 Baumoel
5,349,568 A 9/1994 Kupperman et al.
5,351,655 A 10/1994 Nuspl
5,361,636 A 11/1994 Farstad et al.
5,367,911 A 11/1994 Jewell et al.
5,385,049 A 1/1995 Hunt et al.
5,396,800 A 3/1995 Drinon et al.
5,408,883 A 4/1995 Clark et al.
5,416,724 A 5/1995 Savic
5,461,906 A 10/1995 Bogle et al.
5,519,184 A 5/1996 Umlas
5,526,691 A 6/1996 Latimer et al.
5,531,099 A 7/1996 Russo
5,548,530 A 8/1996 Baumoel
5,581,037 A 12/1996 Kwun et al.
5,591,912 A 1/1997 Spisak et al.
5,602,327 A 2/1997 Torizuka et al.
5,611,948 A 3/1997 Hawkins
5,619,423 A 4/1997 Scrantz
5,623,203 A 4/1997 Hosohara et al.
5,633,467 A 5/1997 Paulson
5,639,958 A 6/1997 Lange
5,655,561 A 8/1997 Wendel et al.
5,686,828 A 11/1997 Peterman et al.
5,708,195 A 1/1998 Kurisu et al.
5,708,211 A 1/1998 Jepson et al.
5,746,611 A 5/1998 Brown et al.
5,754,101 A 5/1998 Tsunetomi et al.
5,760,306 A 6/1998 Wyatt et al.
5,789,720 A 8/1998 Lagally et al.
5,798,457 A 8/1998 Paulson
5,838,633 A 11/1998 Sinha
5,866,820 A 2/1999 Camplin et al.
5,892,163 A 4/1999 Johnson
5,898,412 A 4/1999 Jones et al.
5,907,100 A 5/1999 Cook
5,917,454 A * 6/1999 Hill ........................ H01Q 13/12 343/769
5,965,818 A 10/1999 Wang
5,970,434 A 10/1999 Brophy et al.
5,974,862 A 11/1999 Lander et al.
5,987,990 A 11/1999 Worthington et al.
6,000,277 A 12/1999 Smith
6,000,288 A 12/1999 Kwun et al.
6,003,376 A 12/1999 Burns et al.
6,009,897 A 1/2000 Hill et al.
6,023,986 A 2/2000 Smith et al.
6,035,717 A 3/2000 Carodiskey
6,058,957 A * 5/2000 Honigsbaum ......... F16K 35/022 137/272
6,076,407 A 6/2000 Levesque et al.
6,082,193 A 7/2000 Paulson
6,089,253 A * 7/2000 Stehling .................. F16K 35/10 70/276
6,102,444 A 8/2000 Kozey
6,104,349 A 8/2000 Cohen
6,125,703 A 10/2000 MacLauchlan et al.
6,127,823 A 10/2000 Atherton
6,127,987 A 10/2000 Maruyama et al.
6,133,885 A 10/2000 Luniak et al.
6,138,512 A 10/2000 Roberts et al.
6,138,514 A 10/2000 Iwamoto et al.
6,164,137 A 12/2000 Hancock et al.
6,170,334 B1 1/2001 Paulson
6,175,380 B1 1/2001 Van Den Bosch
6,181,294 B1 * 1/2001 Porter .................... G01R 22/00 343/859
6,192,352 B1 2/2001 Alouani et al.
6,243,657 B1 6/2001 Tuck et al.
6,267,000 B1 7/2001 Harper et al.
6,276,213 B1 8/2001 Lee et al.
6,296,066 B1 10/2001 Terry
6,343,510 B1 2/2002 Neeson et al.
6,363,788 B1 4/2002 Gorman et al.
6,389,881 B1 5/2002 Yang et al.
6,401,525 B1 6/2002 Jamieson
6,404,343 B1 6/2002 Andou et al.
6,442,999 B1 9/2002 Baumoel
6,450,542 B1 * 9/2002 McCue ................... F16L 25/14 285/376
6,453,247 B1 9/2002 Hunaidi
6,470,749 B1 10/2002 Han et al.
6,530,263 B1 3/2003 Chana
6,561,032 B1 5/2003 Hunaidi
6,567,006 B1 5/2003 Lander et al.
6,578,422 B2 6/2003 Lam et al.
6,595,038 B2 7/2003 Williams et al.

(56) References Cited

U.S. PATENT DOCUMENTS 6,606,059 B1 * 8/2003 Barabash ................. H01Q 3/24 343/702
6,624,628 B1 9/2003 Kwun et al.
6,639,562 B2 10/2003 Suganthan et al.
6,647,762 B1 11/2003 Roy
6,651,503 B2 11/2003 Bazarov et al.
6,666,095 B2 12/2003 Thomas et al.
6,667,709 B1 12/2003 Hansen et al.
6,707,762 B1 3/2004 Goodman et al.
6,710,600 B1 3/2004 Kopecki et al.
6,725,705 B1 4/2004 Huebler et al.
6,734,674 B1 5/2004 Struse
6,745,136 B2 6/2004 Lam et al.
6,751,560 B1 6/2004 Tingley et al.
6,763,730 B1 7/2004 Wray
6,772,636 B2 8/2004 Lam et al.
6,772,637 B2 8/2004 Bazarov et al.
6,772,638 B2 8/2004 Matney et al.
6,781,369 B2 8/2004 Paulson et al.
6,782,751 B2 8/2004 Linares et al.
6,789,427 B2 9/2004 Batzinger et al.
6,791,318 B2 9/2004 Paulson et al.
6,799,455 B1 * 10/2004 Neefeldt ............. B60C 23/0408 73/146
6,799,466 B2 10/2004 Chinn
6,813,949 B2 11/2004 Masaniello et al.
6,813,950 B2 11/2004 Glascock et al.
6,816,072 B2 * 11/2004 Zoratti ...................... E03B 9/04 137/272
6,820,016 B2 11/2004 Brown et al.
6,822,742 B1 11/2004 Kalayeh et al.
6,843,131 B2 1/2005 Graff et al.
6,848,313 B2 2/2005 Krieg et al.
6,851,319 B2 2/2005 Ziola et al.
6,889,703 B2 5/2005 Bond
6,904,818 B2 6/2005 Harthorn et al.
6,912,472 B2 6/2005 Mizushina et al.
6,920,792 B2 7/2005 Flora et al.
6,931,931 B2 8/2005 Graff et al.
6,935,178 B2 8/2005 Prause
6,945,113 B2 9/2005 Siverling et al.
6,957,157 B2 10/2005 Lander
6,968,727 B2 11/2005 Kwun et al.
6,978,832 B2 12/2005 Gardner et al.
7,051,577 B2 5/2006 Komninos
7,080,557 B2 7/2006 Adnan
7,109,929 B1 9/2006 Ryken, Jr.
7,111,516 B2 9/2006 Bazarov et al.
7,128,083 B2 * 10/2006 Fleury, Jr. ............. F16K 47/023 137/71
7,140,253 B2 11/2006 Merki et al.
7,143,659 B2 12/2006 Stout et al.
7,171,854 B2 2/2007 Nagashima et al.
7,231,331 B2 6/2007 Davis
7,234,355 B2 6/2007 Dewangan et al.
7,240,574 B2 7/2007 Sapelnikov
7,255,007 B2 8/2007 Messer et al.
7,261,002 B1 8/2007 Gysling et al.
7,266,992 B2 9/2007 Shamout et al.
7,274,996 B2 9/2007 Lapinski
7,283,063 B2 * 10/2007 Salser, Jr. .............. G01D 4/002 361/679.01
7,284,433 B2 10/2007 Ales et al.
7,293,461 B1 11/2007 Girndt
7,299,697 B2 11/2007 Siddu et al.
7,310,877 B2 12/2007 Cao et al.
7,328,618 B2 2/2008 Hunaidi et al.
7,331,215 B2 2/2008 Bond
7,356,444 B2 4/2008 Blemel
7,360,462 B2 4/2008 Nozaki et al.
7,373,808 B2 5/2008 Zanker et al.
7,380,466 B2 6/2008 Deeg
7,383,721 B2 6/2008 Parsons et al.
7,392,709 B2 7/2008 Eckert
7,405,391 B2 7/2008 Ogisu et al.
7,412,882 B2 8/2008 Lazar et al.
7,412,890 B1 8/2008 Johnson et al.
7,414,395 B2 8/2008 Gao et al.
7,426,879 B2 9/2008 Nozaki et al.
7,458,267 B2 12/2008 McCoy
7,475,596 B2 1/2009 Hunaidi et al.
7,493,817 B2 2/2009 Germata
7,523,666 B2 4/2009 Thompson et al.
7,526,944 B2 5/2009 Sabata et al.
7,530,270 B2 5/2009 Nozaki et al.
7,543,500 B2 6/2009 Litzenberg et al.
7,554,345 B2 6/2009 Vokey
7,564,540 B2 7/2009 Paulson
7,587,942 B2 9/2009 Smith et al.
7,590,496 B2 9/2009 Blemel
7,596,458 B2 9/2009 Lander
7,607,351 B2 10/2009 Allison et al.
7,623,427 B2 11/2009 Jann et al.
7,647,829 B2 1/2010 Junker et al.
7,650,790 B2 1/2010 Wright
7,657,403 B2 2/2010 Stripf et al.
7,668,670 B2 2/2010 Lander
7,680,625 B2 3/2010 Trowbridge et al.
7,690,258 B2 4/2010 Minagi et al.
7,694,564 B2 4/2010 Brignac et al.
7,696,940 B1 4/2010 MacDonald
7,711,217 B2 5/2010 Takahashi et al.
7,751,989 B2 7/2010 Owens et al.
7,810,378 B2 10/2010 Hunaidi et al.
7,980,317 B1 7/2011 Preta et al.
8,009,108 B2 * 8/2011 Eisenbeis ................. H01Q 1/40 343/702
8,020,579 B2 * 9/2011 Ruhs ....................... F16K 35/16 320/114
8,319,508 B2 11/2012 Vokey
8,353,309 B1 1/2013 Embry et al.
8,589,092 B2 * 11/2013 Plouffe ..................... E03F 7/00 702/50
8,614,745 B1 * 12/2013 Al Azemi .............. H04N 7/183 348/159
8,657,021 B1 2/2014 Preta et al.
8,668,206 B2 3/2014 Ball
8,674,830 B2 * 3/2014 Lanham ................ E05B 53/003 340/541
8,823,509 B2 9/2014 Hyland et al.
8,843,241 B2 9/2014 Saberi et al.
8,931,505 B2 1/2015 Hyland et al.
9,053,519 B2 6/2015 Scolnicov et al.
9,291,520 B2 3/2016 Fleury, Jr. et al.
9,315,973 B2 * 4/2016 Varman ................... F16K 27/12
9,496,943 B2 11/2016 Parish et al.
9,528,903 B2 12/2016 Zusman
9,562,623 B2 2/2017 Clark
9,593,999 B2 3/2017 Fleury
9,670,650 B2 * 6/2017 Pinney .................... G01M 3/18
9,772,250 B2 9/2017 Richarz et al.
9,780,433 B2 * 10/2017 Schwengler ........... H01Q 21/30
9,799,204 B2 10/2017 Hyland et al.
9,849,322 B2 12/2017 Hyland et al.
9,861,848 B2 1/2018 Hyland et al.
9,970,805 B2 5/2018 Cole et al.
10,175,135 B2 1/2019 Dintakurt et al.
10,283,857 B2 5/2019 Ortiz et al.
10,305,178 B2 5/2019 Gibson et al.
10,317,384 B2 6/2019 Morrow et al.
10,386,257 B2 8/2019 Fleury, Jr. et al.
10,857,403 B2 12/2020 Hyland et al.
10,859,462 B2 12/2020 Gibson et al.
10,881,888 B2 1/2021 Hyland et al.
11,047,761 B1 6/2021 Frackelton et al.
11,067,464 B2 7/2021 Moreno et al.
11,336,004 B2 5/2022 Gibson et al.
11,342,656 B2 5/2022 Gibson et al.
11,422,054 B2 8/2022 Gibson et al.
11,469,494 B2 10/2022 Ortiz et al.
11,473,993 B2 10/2022 Gibson et al.
11,527,821 B2 12/2022 Ortiz et al.
11,542,690 B2 1/2023 Gibson et al.

(56) References Cited

U.S. PATENT DOCUMENTS

| | | | | |
|---|---|---|---|---|
| 11,590,376 | B2 | 2/2023 | Hyland et al. | |
| 11,624,674 | B2 | 4/2023 | Gibson et al. | |
| 11,630,021 | B2 | 4/2023 | Fleury, Jr. et al. | |
| 11,652,284 | B2 | 5/2023 | Ortiz et al. | |
| 11,680,865 | B2 | 6/2023 | Fleury, Jr. et al. | |
| 11,692,901 | B2 | 7/2023 | Gibson et al. | |
| 11,837,782 | B2 | 12/2023 | Ortiz et al. | |
| 12,078,572 | B2 | 9/2024 | Gibson et al. | |
| 12,212,053 | B2 | 1/2025 | Gibson et al. | |
| 2001/0045129 | A1 | 11/2001 | Williams et al. | |
| 2002/0043549 | A1 | 4/2002 | Taylor et al. | |
| 2002/0124633 | A1 | 9/2002 | Yang et al. | |
| 2002/0159584 | A1 | 10/2002 | Sindalovsky et al. | |
| 2003/0107485 | A1* | 6/2003 | Zoratti | A62C 31/28 340/568.1 |
| 2003/0150488 | A1 | 8/2003 | Fleury, Jr. et al. | |
| 2003/0193193 | A1 | 10/2003 | Harrington et al. | |
| 2004/0129312 | A1* | 7/2004 | Cuzzo | F16K 35/10 137/296 |
| 2004/0173006 | A1 | 9/2004 | McCoy et al. | |
| 2004/0187922 | A1 | 9/2004 | Fleury, Jr. et al. | |
| 2004/0201215 | A1 | 10/2004 | Steingass | |
| 2005/0005680 | A1 | 1/2005 | Anderson | |
| 2005/0067022 | A1 | 3/2005 | Istre | |
| 2005/0072214 | A1 | 4/2005 | Cooper | |
| 2005/0121880 | A1 | 6/2005 | Santangelo | |
| 2005/0153586 | A1 | 7/2005 | Girinon | |
| 2005/0279169 | A1 | 12/2005 | Lander | |
| 2006/0101915 | A1* | 5/2006 | Thompson | G01M 3/246 73/592 |
| 2006/0173648 | A1 | 8/2006 | Chang | |
| 2006/0174707 | A1 | 8/2006 | Zhang | |
| 2006/0201550 | A1 | 9/2006 | Blyth et al. | |
| 2006/0283251 | A1 | 12/2006 | Hunaidi | |
| 2006/0284784 | A1* | 12/2006 | Smith | G01D 4/008 343/872 |
| 2007/0044552 | A1 | 3/2007 | Huang | |
| 2007/0051187 | A1 | 3/2007 | McDearmon | |
| 2007/0113618 | A1 | 5/2007 | Yokoi et al. | |
| 2007/0130317 | A1 | 6/2007 | Lander | |
| 2007/0295406 | A1 | 12/2007 | German et al. | |
| 2008/0068216 | A1* | 3/2008 | Borisov | H01Q 9/0407 343/720 |
| 2008/0078567 | A1 | 4/2008 | Miller et al. | |
| 2008/0079640 | A1 | 4/2008 | Yang | |
| 2008/0129536 | A1* | 6/2008 | Randall | H01Q 1/2233 343/793 |
| 2008/0168840 | A1 | 7/2008 | Seeley et al. | |
| 2008/0189056 | A1 | 8/2008 | Heidl et al. | |
| 2008/0238711 | A1 | 10/2008 | Payne et al. | |
| 2008/0281534 | A1 | 11/2008 | Hurley | |
| 2008/0307623 | A1 | 12/2008 | Furukawa | |
| 2008/0314122 | A1 | 12/2008 | Hunaidi | |
| 2009/0025798 | A1 | 1/2009 | Garcia et al. | |
| 2009/0044628 | A1 | 2/2009 | Lotscher | |
| 2009/0133887 | A1 | 5/2009 | Garcia et al. | |
| 2009/0139336 | A1 | 6/2009 | Trowbridge, Jr. et al. | |
| 2009/0182099 | A1 | 7/2009 | Noro et al. | |
| 2009/0214941 | A1 | 8/2009 | Buck et al. | |
| 2009/0278293 | A1 | 11/2009 | Yoshinaka et al. | |
| 2009/0301571 | A1* | 12/2009 | Ruhs | E03B 9/06 251/65 |
| 2010/0077234 | A1 | 3/2010 | Das | |
| 2010/0156632 | A1 | 6/2010 | Hyland et al. | |
| 2010/0259461 | A1 | 10/2010 | Eisenbeis et al. | |
| 2010/0290201 | A1 | 11/2010 | Takeuchi et al. | |
| 2010/0295672 | A1 | 11/2010 | Hyland et al. | |
| 2010/0302111 | A1* | 12/2010 | Kotaka | H01Q 9/285 343/702 |
| 2011/0063124 | A1* | 3/2011 | Bartram | G01D 4/002 340/870.02 |
| 2011/0063172 | A1* | 3/2011 | Podduturi | H01Q 5/371 343/700 MS |
| 2011/0066297 | A1 | 3/2011 | Saberi | |
| 2011/0079402 | A1 | 4/2011 | Darby et al. | |
| 2011/0102281 | A1 | 5/2011 | Su | |
| 2011/0162463 | A1 | 7/2011 | Allen | |
| 2011/0308638 | A1* | 12/2011 | Hyland | G01D 4/004 137/299 |
| 2012/0007743 | A1 | 1/2012 | Solomon | |
| 2012/0007744 | A1 | 1/2012 | Pal et al. | |
| 2012/0049021 | A1* | 3/2012 | Nahar | H01Q 1/2233 248/220.21 |
| 2012/0098710 | A1* | 4/2012 | Seal | H01Q 1/12 343/702 |
| 2012/0169560 | A1 | 7/2012 | Lee et al. | |
| 2012/0296580 | A1 | 11/2012 | Barkay | |
| 2012/0324985 | A1 | 12/2012 | Gu et al. | |
| 2013/0036796 | A1* | 2/2013 | Fleury, Jr. | G01M 3/24 73/40.5 R |
| 2013/0041601 | A1* | 2/2013 | Dintakurti | H01Q 1/38 702/51 |
| 2013/0049968 | A1 | 2/2013 | Fleury, Jr | |
| 2013/0145826 | A1 | 6/2013 | Richarz et al. | |
| 2013/0211797 | A1 | 8/2013 | Scolnicov | |
| 2013/0229262 | A1 | 9/2013 | Bellows | |
| 2013/0298664 | A1 | 11/2013 | Gillette, II et al. | |
| 2013/0321231 | A1 | 12/2013 | Flores-Cuadras | |
| 2014/0118202 | A1* | 5/2014 | Lin | H01Q 3/04 343/720 |
| 2014/0197999 | A1* | 7/2014 | Podduturi | H01Q 1/2233 343/702 |
| 2014/0206210 | A1 | 7/2014 | Ritner | |
| 2014/0225787 | A1* | 8/2014 | Ramachandran | H01Q 13/10 343/702 |
| 2014/0261699 | A1 | 9/2014 | Gifford | |
| 2014/0373941 | A1* | 12/2014 | Varman | F16K 35/10 137/296 |
| 2015/0070221 | A1 | 3/2015 | Schwengler et al. | |
| 2015/0082868 | A1* | 3/2015 | Hyland | E03B 9/06 73/40.5 R |
| 2015/0128714 | A1 | 5/2015 | Moss | |
| 2016/0001114 | A1* | 1/2016 | Hyland | F17D 5/02 73/168 |
| 2016/0013565 | A1* | 1/2016 | Ortiz | H01Q 1/3275 29/601 |
| 2016/0018283 | A1 | 1/2016 | Fleury et al. | |
| 2016/0084694 | A1 | 3/2016 | Cole | |
| 2016/0097696 | A1 | 4/2016 | Zusman | |
| 2016/0187157 | A1* | 6/2016 | Azulay | G01F 15/14 340/870.02 |
| 2017/0018837 | A1* | 1/2017 | Bietz | H01Q 1/50 |
| 2017/0072238 | A1 | 3/2017 | Silvers et al. | |
| 2017/0121949 | A1 | 5/2017 | Fleury et al. | |
| 2017/0130431 | A1 | 5/2017 | Pinney et al. | |
| 2017/0237158 | A1* | 8/2017 | Gibson | H01Q 1/42 343/872 |
| 2017/0237165 | A1* | 8/2017 | Ortiz | H01Q 21/28 |
| 2017/0358856 | A1* | 12/2017 | Elmerick | H01Q 21/24 |
| 2018/0080849 | A1 | 3/2018 | Showcatally et al. | |
| 2018/0093117 | A1 | 4/2018 | Hyland et al. | |
| 2018/0224349 | A1 | 8/2018 | Fleury, Jr. et al. | |
| 2019/0024352 | A1* | 1/2019 | Ozburn | E03B 9/06 |
| 2019/0214717 | A1 | 7/2019 | Gibson et al. | |
| 2019/0214718 | A1 | 7/2019 | Ortiz et al. | |
| 2019/0316983 | A1 | 10/2019 | Fleury, Jr. et al. | |
| 2020/0069987 | A1 | 3/2020 | Hyland et al. | |
| 2020/0072697 | A1* | 3/2020 | Gibson | E03B 9/10 |
| 2020/0212549 | A1 | 7/2020 | Gibson et al. | |
| 2020/0232863 | A1 | 7/2020 | Moreno et al. | |
| 2020/0232864 | A1 | 7/2020 | Moreno et al. | |
| 2020/0378859 | A1* | 12/2020 | Gibson | F16L 55/1152 |
| 2021/0023408 | A1 | 1/2021 | Hyland et al. | |
| 2021/0041323 | A1 | 2/2021 | Gibson et al. | |
| 2021/0247261 | A1 | 8/2021 | Gibson et al. | |
| 2021/0249765 | A1 | 8/2021 | Ortiz et al. | |
| 2021/0302056 | A1 | 9/2021 | Eskew et al. | |
| 2021/0355661 | A1* | 11/2021 | Gibson | E03B 9/06 |
| 2022/0082467 | A1 | 3/2022 | Fleury, Jr. et al. | |
| 2022/0190471 | A1 | 6/2022 | Gibson et al. | |
| 2022/0291073 | A1 | 9/2022 | Gibson et al. | |
| 2022/0294104 | A1 | 9/2022 | Ortiz et al. | |

(56) References Cited

U.S. PATENT DOCUMENTS

| | | | |
|---|---|---|---|
| 2022/0302580 | A1 | 9/2022 | Ortiz et al. |
| 2023/0092513 | A1 | 3/2023 | Gibson et al. |
| 2023/0108605 | A1 | 4/2023 | Hyland et al. |
| 2023/0184617 | A1 | 6/2023 | Gibson et al. |
| 2023/0352825 | A1 | 11/2023 | Ortiz et al. |
| 2024/0142331 | A1 | 5/2024 | Sobhani et al. |
| 2024/0369438 | A1 | 11/2024 | Gibson et al. |
| 2024/0392543 | A1 | 11/2024 | Gibson et al. |
| 2025/0158273 | A1 | 5/2025 | Gibson et al. |

FOREIGN PATENT DOCUMENTS

| | | |
|---|---|---|
| AU | 2017248541 | 3/2019 |
| CA | 2154433 | 1/1997 |
| CA | 2397174 | 8/2008 |
| CA | 2634739 | 6/2015 |
| CA | 3010333 | 7/2020 |
| CA | 2766850 | 8/2020 |
| CA | 3023529 | 8/2020 |
| CA | 3070690 | 11/2020 |
| CA | 2842042 | 1/2021 |
| CA | 3057167 | 3/2021 |
| CA | 3057202 | 5/2021 |
| CA | 3060512 | 6/2021 |
| CA | 3010345 | 7/2021 |
| CA | 3095465 | 9/2022 |
| CA | 3116787 | 7/2023 |
| CA | 3113517 | 8/2023 |
| CA | 3119150 | 8/2023 |
| CA | 3102529 | 9/2023 |
| CA | 3057224 | 10/2023 |
| CA | 3105683 | 10/2023 |
| CN | 1831478 | 6/2013 |
| DE | 4211038 | 10/1993 |
| DE | 19757581 | 7/1998 |
| EP | 0711986 | 5/1996 |
| EP | 1052492 | 11/2000 |
| EP | 1077370 | 2/2001 |
| EP | 1077371 | 2/2001 |
| EP | 3293315 | 3/2018 |
| EP | 3449062 | 6/2023 |
| EP | 3837400 | 7/2024 |
| FR | 2439990 | 5/1980 |
| GB | 2250820 | 6/1992 |
| GB | 2269900 | 2/1994 |
| GB | 2367362 | 4/2002 |
| GB | 2421311 | 6/2006 |
| GB | 2550908 | 12/2017 |
| JP | 59170739 | 9/1984 |
| JP | 60111132 | 6/1985 |
| JP | 08250777 | 9/1996 |
| JP | H10-2744 | 1/1998 |
| JP | 11201859 | 7/1999 |
| JP | H11210028 | 8/1999 |
| JP | 2000131179 | 5/2000 |
| JP | 2002206965 | 7/2002 |
| JP | 2002310840 | 10/2002 |
| JP | 3595856 | 12/2004 |
| JP | 2005315663 | 11/2005 |
| JP | 2005321935 | 11/2005 |
| JP | 2006062414 | 3/2006 |
| JP | 2006062716 | 3/2006 |
| JP | 2007047139 | 2/2007 |
| JP | 2010068017 | 3/2010 |
| JP | 2013528732 | 7/2013 |
| JP | H5654124 | 11/2014 |
| KR | 101785664 | 11/2017 |
| TW | 201117974 | 6/2011 |
| WO | 9850771 | 11/1998 |
| WO | 0151904 | 7/2001 |
| WO | 03049528 | 6/2003 |
| WO | 2004073115 | 8/2004 |
| WO | 2005052573 | 6/2005 |
| WO | 2008047159 | 4/2008 |
| WO | 2009057214 | 5/2009 |
| WO | 2010135587 | 11/2010 |
| WO | 2011021039 | 2/2011 |
| WO | 2011058561 | 5/2011 |
| WO | 2011159403 | 12/2011 |
| WO | 2012000088 | 1/2012 |
| WO | 2012153147 | 11/2012 |
| WO | 2013025526 | 2/2013 |
| WO | 2014016625 | 1/2014 |
| WO | 2017139029 | 8/2017 |
| WO | 2017139030 | 8/2017 |
| WO | 2020050946 | 3/2020 |
| WO | 2021231163 | 11/2021 |

OTHER PUBLICATIONS

US 11,309,624 B2, 04/2022, Gibson et al. (withdrawn)
US 11,378,481 B2, 07/2022, Gibson et al. (withdrawn)
US 11,378,482 B2, 07/2022, Gibson et al. (withdrawn)
US 11,404,772 B2, 08/2022, Ortiz et al. (withdrawn)
US 11,495,879 B2, 11/2022, Ortiz et al. (withdrawn)
US 11,554,278 B2, 01/2023, Hyland et al. (withdrawn)
US 11,621,483 B2, 04/2023, Ortiz et al. (withdrawn)
Ortiz, Jorge Isaac; Notice of Allowance for U.S. Appl. No. 17/833,230, filed Jun. 6, 2022, mailed Apr. 10, 2023, 7 pgs.
Gibson, Daryl Lee; Final Office Action for U.S. Appl. No. 17/683,090, filed Feb. 28, 2022, mailed Mar. 8, 2023, 16 pgs.
Gibson, Daryl Lee; Notice of Allowance for U.S. Appl. No. 17/827,468, filed May 27, 2022, mailed May 15, 2023, 99 pgs.
Gibson, Daryl Lee; Extended European Search Report for application No. 23154819.9, filed Dec. 20, 2016, mailed Apr. 28, 2023, 16 pgs.
Gibson, Daryl Lee; Office Action for European patent application No. 21180958.7, filed Aug. 7, 2019, mailed Apr. 26, 2023, 4 pgs.
Hyland, Gregory E .; Notice of Allowance for U.S. Appl. No. 17/071,632, filed Oct. 15, 2020, mailed Jun. 24, 2022, 11 pgs.
Ortiz, Jorge Isaac, Notice of Allowance for U.S. Appl. No. 16/354,939, filed Mar. 15, 2019, mailed Jun. 9, 2022, 10 pgs.
Gibson, Daryl Lee; Non-Final Office Action for U.S. Appl. No. 17/245,419, filed Apr. 30, 2021, mailed Jul. 20, 2022, 37 pgs.
Gibson, Daryl Lee; Non-Final Office Action for U.S. Appl. No. 16/874,340, filed May 14, 2020, mailed May 27, 2022, 126 pgs.
Fleury Jr., Leo W.; Final Office Action for U.S. Appl. No. 16/453,318, filed Jun. 26, 2019, mailed Aug. 8, 2022, 53 pgs.
Sansei Denki KK; Translation for JP3595856(B2), published on Dec. 2, 2004, 12 pgs.
Wallace & Tiernan; Brochure for Hydraclam continuous water quality monitoring via hydrants, Allegedly Available as Early as 2008, 3 pgs.
Wallace & Tiernan; Brochure for Hydraclam Distribution Water Quality Monitoring SB.50.700GE, Allegedly Available as Early as 2008, 8 pgs.
Wallace & Tiernan; Product Sheet for Wallace & Tiernan Analysers and Controllers-HydraClam Water Quality Monitor with Remote Communications, Allegedly Available as Early as 2008, 4 pgs.
Gibson, Daryl Lee; Office Action for Canadian patent application No. 3,113,517, filed Oct. 1, 2019, mailed Jul. 8, 2022, 5 pgs.
Gibson, Daryl Lee; Non-Final Office Action for U.S. Appl. No. 17/683,090, filed Feb. 28, 2022, mailed Aug. 2, 2023, 23 pgs.
Fleury Jr., Leo W.; Notice of Allowance for U.S. Appl. No. 17/536,292, filed Nov. 29, 2021, mailed Feb. 28, 2023, 108 pgs.
Ortiz, Jorge Isaac; Final Office Action for U.S. Appl. No. 17/833,230, filed Jun. 6, 2022, mailed Feb. 10, 2023, 30 pgs.
Ortiz, Jorge Isaac; Notice of Allowance for U.S. Appl. No. 17/829,759, filed Jun. 1, 2022, mailed Feb. 15, 2023, 17 pgs.
Gibson, Daryl Lee; Notice of Allowance for U.S. Appl. No. 17/245,419, filed Apr. 30, 2021, mailed Feb. 23, 2023, 15 pgs.
Fleury Jr., Leo W.; Notice of Allowance for U.S. Appl. No. 16/453,318, filed Jun. 26, 2019, mailed Oct. 25, 2022, 43 pgs.
Fleury Jr., Leo W.; Notice of Allowance for U.S. Appl. No. 16/453,318, filed Jun. 26, 2019, mailed Dec. 5, 2022, 146 pgs.
Fleury, Leo W., Jr.; Office Action for Canadian patent application No. 3,102,529, filed Aug. 10, 2012, mailed Oct. 25, 2022, 4 pgs.

(56) References Cited

OTHER PUBLICATIONS

Ortiz, Jorge Isaac; Non-Final Office Action for U.S. Appl. No. 17/833,230, filed Jun. 6, 2022, mailed Oct. 25, 2022, 98 pgs.
Ortiz, Jorge Isaac; Non-Final Office Action for U.S. Appl. No. 17/829,759, filed Jun. 1, 2022, mailed Oct. 24, 2022, 92 pgs.
Gibson, Daryl Lee; Non-Final Office Action for U.S. Appl. No. 17/683,090, filed Feb. 28, 2022, mailed Dec. 13, 2022, 101 pgs.
Gibson, Daryl Lee; Requirement for Restriction/Election for U.S. Appl. No. 17/683,090, filed Feb. 28, 2022, mailed Nov. 9, 2022, 5 pgs.
Gibson, Daryl Lee; Notice of Allowance for U.S. Appl. No. 17/245,419, filed Apr. 30, 2021, mailed Nov. 4, 2022, 22 pgs.
Gibson, Daryl Lee; Office Action for Canadian patent application No. 3,105,683, filed Aug. 7, 2019, mailed Dec. 1, 2022, 3 pgs.
Gibson, Daryl Lee; Supplementary Examination Written Opinion for Singapore patent application No. 11202101803V, filed Jul. 8, 2019, mailed Nov. 2, 2022, 4 pgs.
Gibson, Daryl Lee; International Preliminary Report on Patentability for PCT Application No. PCT/US21/31033, filed May 6, 2021, mailed Nov. 24, 2022, 9 pgs.
Hyland, Gregory E.; Notice of Allowance for U.S. Appl. No. 17/071,632, filed Oct. 15, 2020, mailed Aug. 29, 2022, 10 pgs.
Hyland, Gregory E.; Office Action for Canadian patent application No. 3,116,787, filed Apr. 29, 2020, mailed Aug. 15, 2022, 4 pgs.
Ortiz, Jorge Isaac; Notice of Allowance for U.S. Appl. No. 16/354,939, filed Mar. 15, 2019, mailed Sep. 2, 2022, 9 pgs.
Ortiz, Jorge Isaac; Notice of Allowance for U.S. Appl. No. 17/245,181, filed Apr. 30, 2021, mailed Sep. 19, 2022, 11 pgs.
Gibson, Daryl Lee; Notice of Allowance for U.S. Appl. No. 16/428,744, filed May 31, 2019, mailed Sep. 14, 2022, 12 pgs.
Gibson, Daryl Lee; Office Action for Canadian patent application No. 3,119,150, filed Dec. 20, 2016, mailed Sep. 15, 2022, 6 pgs.
Gibson, Daryl Lee; Notice of Allowance for U.S. Appl. No. 16/874,340, filed May 14, 2020, mailed Sep. 12, 2022, 16 pgs.
Fleury, Jr., Leo W.; Non-Final Office Action for U.S. Appl. No. 15/939,942, filed Mar. 29, 2018, mailed May 27, 2020, 23 pgs.
Fleury, Jr., Leo W .; Non-Final Office Action for U.S. Appl. No. 15/939,942, filed Mar. 29, 2018, mailed Sep. 25, 2019, 92 pgs.
FleuryJr., Leo W.; Final Office Action for U.S. Appl. No. 15/939,942, filed Mar. 29, 2018, mailed Aug. 27, 2021, 30 pgs.
Richarz, Werner Guenther, Corrected Notice of Allowability for U.S. Appl. No. 13/492,792, filed Jun. 8, 2012, mailed Aug. 29, 2017, 6 pgs.
Richarz, Werner Guenther; Final Office Action for U.S. Appl. No. 13/492,792, filed Jun. 8, 2012, mailed Oct. 20, 2014, 17 pgs.
Richarz, Werner Guenther; Final Office Action for U.S. Appl. No. 13/492,792, filed Jun. 8, 2012, mailed Sep. 10, 2015, 20 pgs.
Richarz, Werner Guenther; Final Office Action for U.S. Appl. No. 13/492,792, filed Jun. 8, 2012, mailed Sep. 8, 2016, 36 pgs.
Richarz, Werner Guenther; Issue Notification for U.S. Appl. No. 13/492,792, filed Jun. 8, 2012, mailed Sep. 6, 2017, 1 pg.
Richarz, Werner Guenther, Non-Final Office Action for U.S. Appl. No. 13/492,792, filed Jun. 8, 2012, mailed Nov. 6, 2013, 39 pgs.
Richarz, Werner Guenther; Non-Final Office Action for U.S. Appl. No. 13/492,792, filed Jun. 8, 2012, mailed Jun. 4, 2014, 24 pgs.
Richarz, Werner Guenther; Non-Final Office Action for U.S. Appl. No. 13/492,792, filed Jun. 8, 2012, mailed Feb. 27, 2015, 15 pgs.
Richarz, Werner Guenther; Non-Final Office Action for U.S. Appl. No. 13/492,792, filed Jun. 8, 2012, mailed Mar. 8, 2016, 27 pgs.
Richarz, Werner Guenther; Notice of Allowance for U.S. Appl. No. 13/492,792, filed Jun. 8, 2012, mailed Jun. 13, 2017, 31 pgs.
Richarz, Werner Guenther; Restriction Requirement for U.S. Appl. No. 13/492,792, filed Jun. 8, 2012, mailed Sep. 27, 2013; 5 pgs.
Chou, et al.; Article entitled: "Non-invasive Acceleration-based Methodology for Damage Detection and Assessment of Water Distribution System", Mar. 2010, 17 pgs.
Dintakurti, Ganapathi Deva Varma; Corrected Notice of Allowance for U.S. Appl. No. 13/492,794, filed Jun. 8, 2012, mailed Dec. 6, 2018, 6 pgs.
Dintakurti, Ganapathi Deva Varma; Final Office Action for U.S. Appl. No. 13/492,794, filed Jun. 8, 2012, mailed Oct. 18, 2017, 38 pgs.
Dintakurti, Ganapathi Deva Varma; Final Office Action for U.S. Appl. No. 13/492,794, filed Jun. 8, 2012, mailed Nov. 8, 2016, 31 pgs.
Dintakurti, Ganapathi Deva Varma; Final Office Action for U.S. Appl. No. 13/492,794, filed Jun. 8, 2012, mailed Jun. 22, 2018, 39 pgs.
Dintakurti, Ganapathi Deva Varma; Issue Notification for U.S. Appl. No. 13/492,794, filed Jun. 8, 2012, mailed Dec. 19, 2018, 1 pg.
Dintakurti, Ganapathi Deva Varma; Non-Final Office Action for U.S. Appl. No. 13/492,794, filed Jun. 8, 2012, mailed Mar. 16, 2017, 30 pgs.
Dintakurti, Ganapathi Deva Varma; Non-Final Office Action for U.S. Appl. No. 13/492,794, filed Jun. 8, 2012, mailed May 17, 2016, 48 pgs.
Dintakurti, Ganapathi Deva Varma; Non-Final Office Action for U.S. Appl. No. 13/492,794, filed Jun. 8, 2012, mailed Jan. 11, 2018, 38 pgs.
Dintakurti, Ganapathi Deva Varma; Non-Final Office Action for U.S. Appl. No. 13/492,794, filed Jun. 8, 2012, mailed Jan. 16, 2015, 60 pgs.
Dintakurti, Ganapathi Deva Varma; Notice of Allowance for U.S. Appl. No. 13/492,794, filed Jun. 8, 2012, mailed Sep. 24, 2018, 21 pgs.
Fleury Jr, Leo W.; Non-Final Office Action for U.S. Appl. No. 13/492,795, filed Jun. 8, 2012, mailed Sep. 23, 2013; 35 pgs.
Fleury, Jr., Leo W.; Advisory Action for U.S. Appl. No. 13/492,795, filed Jun. 8, 2012, mailed Jun. 18, 2014, 4 pgs.
Fleury, Jr., Leo W.; Advisory Action for U.S. Appl. No. 13/492,795, filed Jun. 8, 2012, mailed Sep. 9, 2015, 3 pgs.
Fleury, Jr., Leo W.; Corrected Notice of Allowability for U.S. Appl. No. 13/492,795, filed Jun. 8, 2012, mailed Feb. 14, 2017; 8 pgs.
Fleury, Jr., Leo W.; Final Office Action for U.S. Appl. No. 13/492,795, filed Jun. 8, 2012, mailed Apr. 23, 2014, 19 pgs.
Fleury, Jr., Leo W.; Final Office Action for U.S. Appl. No. 13/492,795, filed Jun. 8, 2012, mailed May 22, 2015, 28 pgs.
Fleury, Jr., Leo W.; Issue Notification for U.S. Appl. No. 13/492,795, filed Jun. 8, 2012, mailed Feb. 22, 2017; 1 page.
Fleury, Jr., Leo W.; Non-Final Office Action for U.S. Appl. No. 13/492,795, filed Jun. 8, 2012, mailed Oct. 21, 2014, 37 pgs.
Fleury, Jr., Leo W.; Non-Final Office Action for U.S. Appl. No. 13/492,795, filed Jun. 8, 2012, mailed Mar. 1, 2016, 42 pgs.
Fleury, Jr., Leo W.; Notice of Allowability for U.S. Appl. No. 13/492,795, filed Jun. 8, 2012, mailed Oct. 24, 2016, 13 pgs.
Fleury, Jr., Leo W.; Notice of Allowance for U.S. Appl. No. 13/492,795, filed Jun. 8, 2012, mailed Sep. 21, 2016, 18 pgs.
Fleury, Jr., Leo W.; Supplemental Notice of Allowance for U.S. Appl. No. 13/492,795, filed Jun. 8, 2012, mailed Nov. 22, 2016; 8 pgs.
Fleury, Jr., Leo W.; Corrected Notice of Allowance for U.S. Appl. No. 15/401,457, filed Jan. 9, 2017, mailed Jun. 26, 2019, 55 pgs.
Fleury, Jr., Leo W.; Notice of Allowance for U.S. Appl. No. 15/401,457, filed Jan. 9, 2017, mailed Apr. 16, 2019, 88 pgs.
Fleury, Jr.; Non-Final Office Action for U.S. Appl. No. 16/453,318, filed Jun. 26, 2019, mailed Mar. 2, 2022, 129 pgs.
Hyland; International Preliminary Report on Patentability for serial No. PCT/US2011/035374, filed May 5, 2011, mailed Dec. 19, 2012; 5 pgs.
Hyland; International Search Report and Written Opinion for serial No. PCT/US2011/035374, filed May 5, 2011, mailed Sep. 13, 2011; 7 pgs.
Hyland, Gregory E..; Office Action for Canadian Patent Application No. 2,766,850, filed May 5, 2011, mailed Mar. 13, 2017, 4 pgs.
Hyland, Gregory E.; Office Action for Canadian application No. 2,766,850, filed May 5, 2011, mailed Aug. 16, 2018, 4 pgs.
Hyland, Gregory E.; Office Action for Canadian patent application No. 2,766,850, filed May 5, 2011, mailed Jun. 19, 2019, 4 pgs.
Hyland, Gregory E.; Mexico Office Action for serial No. MX/a/2012/000347, filed May 5, 2011, mailed Dec. 13, 2016, 5 pgs.

(56) References Cited

OTHER PUBLICATIONS

Hyland, Gregory E.; Mexico Office Action for serial No. MX/a/2012/000347, filed May 5, 2011, mailed May 30, 2016, 4 pgs.
Hyland, Gregory E.; Mexico Office Action for serial No. MX/a/2012/000347, filed May 5, 2011, mailed Aug. 31, 2016, 4 pgs.
Hyland, Gregory E.; Office Action for European patent application No. 11796120.1, filed May 5, 2011, mailed Feb. 9, 2018, 4 pgs.
Hyland, Gregory; Extended European Search Report for serial No. 11796120.1, filed May 5, 2011, mailed Nov. 4, 2016, 8 pgs.
Ortiz, Jorge Isaac; Office Action for Canadian patent application No. 3,168,445, filed Dec. 20, 2016, mailed Sep. 22, 2023, 4 pgs.
Ortiz, Jorge Isaac; Office Action for Canadian patent application No. 3,168,447, filed Dec. 20, 2016, mailed Sep. 25, 2023, 4 pgs.
Hyland, Gregory E.; Non-Final Office Action of U.S. Appl. No. 18/070,154, filed Nov. 28, 2022, mailed Mar. 27, 2024, 105 pgs.
Fleury, Leo W. Jr.; Office Action for Canadian patent application No. 3,161,904, filed Aug. 10, 2012, mailed Aug. 22, 2023, 4 pgs.
Gibson, Daryl Lee; Final Office Action for U.S. Appl. No. 17/683,090, filed Feb. 28, 2022, mailed Mar. 29, 2024, 18 pgs.
Hyland, Gregory E.; Office Action for Canadian patent application No. 3,177,996, filed Apr. 29, 2020, mailed Apr. 9, 2024, 4 pgs.
Gibson, Daryl Lee; Notice of Allowance for U.S. Appl. No. 18/106,190, filed Feb. 6, 2023, mailed Apr. 12, 2024. 13 pgs.
Gibson, Daryl Lee; Office Action for Canadian patent application No. 3,177,216, filed Dec. 20, 2016, mailed Apr. 2, 2024, 5 pgs.
Gibson, Daryl Lee; Notice of Allowance for U.S. Appl. No. 18/071,359, filed Nov. 29, 2022, mailed May 14, 2024, 17 pgs.
Gibson, Daryl Lee; Non-Final Office Action for U.S. Appl. No. 17/683,090, filed Feb. 28, 2022, mailed Dec. 21, 2023, 20 pgs.
ABT, Inc.; Installation Instructions for Belleville washer springs (Year: 2014), 1 pg.
Endeavour Tools; Catalogue for Security fasteners (Year: 2007), 52 pgs.
Gibson, Daryl Lee; Non-Final Office Action for U.S. Appl. No. 18/106,190, filed Feb. 6, 2023, mailed Dec. 13, 2023, 122 pgs.
Gibson, Daryl Lee; Non-Final Office Action for U.S. Appl. No. 18/071,359, filed Nov. 29, 2022, mailed Feb. 8, 2024, 154 pgs.
Fleury, Jr., Leo W.; Office Action for Canadian patent application No. 3,161,913, filed Aug. 10, 2012, mailed Jun. 17, 2024, 3 pgs.
Hyland, Gregory E.; Non-Final Office Action for U.S. Appl. No. 18/070,154, filed Nov. 28, 2022, mailed Feb. 11, 2025, 30 pgs.
Hyland, Gregory E.; Final Office Action for U.S. Appl. No. 18/070,154, filed Nov. 28, 2022, mailed Sep. 30, 2024, 30 pgs.
Gibson, Daryl Lee; Notice of Allowance for U.S. Appl. No. 17/683,090, filed Feb. 28, 2022, mailed Sep. 26, 2024, 17 pgs.
Tan, John; Notice of Eligibility and Examination Report for Singapore Patent Application No. 10202105366P, filed Aug. 7, 2019, mailed Nov. 15, 2024, 4 pgs.
Fleury, Jr., Leo W.; Office Action for Canadian Patent Application No. 3,161,913, filed Aug. 10, 2012, mailed Mar. 12, 2025, 3 pgs.
Ortiz, Jorge Isaac; Non-Final Office Action for U.S. Appl. No. 18/219,826, filed Jul. 10, 2023, mailed Mar. 14, 2025, 125 pgs.
Gibson, Daryl Lee; Official Action for European Patent Application No. 23154819.9, filed Dec. 20, 2016, mailed Apr. 25, 2025, 7 pgs.
Gibson, D.; Notice of Allowance for Canadian Patent Application No. 3,207,167 filed Aug. 7, 2019, mailed Feb. 6, 2025, 1 pg.
Sobhani, Mohammad Hassan; Non-Final Office Action for U.S. Appl. No. 17/976,314, filed Oct. 28, 2022, mailed May 1, 2025, 145 pgs.
Gibson, Daryl Lee; Notice of Allowance for U.S. Appl. No. 15/255,795, filed Sep. 2, 2016, mailed Jan. 17, 2019, 17 pgs.
Gibson, Daryl Lee; Final Office Action for U.S. Appl. No. 16/352,045, filed Mar. 13, 2019, mailed May 4, 2021, 33 pgs.
Gibson, Daryl Lee; Non-Final Office Action for U.S. Appl. No. 16/352,045, filed Mar. 13, 2019, mailed Nov. 25, 2020, 106 pgs.
Gibson, Daryl Lee; Non-Final Office Action for U.S. Appl. No. 16/352,045, filed Mar. 13, 2019, mailed Aug. 13, 2021, 20 pgs.
Gibson, Daryl Lee; Notice of Allowance for U.S. Appl. No. 16/352,045, filed Mar. 13, 2019, mailed Dec. 1, 2021, 24 pgs.
Gibson, Daryl Lee; Applicant-Initiated Interview Summary for U.S. Appl. No. 16/234,715, filed Dec. 28, 2018, mailed Oct. 14, 2021, 2 pgs.
Gibson, Daryl Lee; Final Office Action for U.S. Appl. No. 16/234,715, filed Dec. 28, 2018, mailed Aug. 5, 2021, 21 pgs.
Gibson, Daryl Lee; Non-Final Office Action for U.S. Appl. No. 16/234,715, filed Dec. 28, 2018, mailed Jan. 1, 2021, 105 pgs.
Gibson, Daryl Lee; Notice of Allowance for U.S. Appl. No. 16/234,715, filed Dec. 28, 2018, mailed Dec. 7, 2021, 23 pgs.
Gibson, Daryl Lee; Corrected Notice of Allowance for U.S. Appl. No. 16/121,136, filed Sep. 4, 2018, mailed Nov. 9, 2020, 6 pgs.
Gibson, Daryl Lee; Non-Final Office Action for U.S. Appl. No. 16/121,136, filed Sep. 4, 2018, mailed Jun. 22, 2020, 94 pgs.
Gibson, Daryl Lee; Notice of Allowance for U.S. Appl. No. 16/121,136, filed Sep. 4, 2018, mailed Sep. 29, 2020, 15 pgs.
Gibson, Daryl Lee; Requirement for Restriction/Election for U.S. Appl. No. 16/121,136, filed Sep. 14, 2018, mailed May 7, 2020, 5 pgs.
Gibson, Daryl Lee; Applicant-Initiated Interview Summary for U.S. Appl. No. 17/079,642, filed Oct. 26, 2020, mailed Feb. 9, 2022, 2 pgs.
Gibson, Daryl Lee; Final Office Action for U.S. Appl. No. 17/079,642, filed Oct. 26, 2020, mailed Dec. 14, 2021, 17 pgs.
Gibson, Daryl Lee; Non-Final Office Action for U.S. Appl. No. 17/079,642, filed Oct. 26, 2020, mailed Aug. 30, 2021, 84 pgs.
Gibson, Daryl Lee; Notice of Allowance for U.S. Appl. No. 17/079,642, filed Oct. 26, 2020, mailed Mar. 1, 2022, 11 pgs.
ABT, Inc., Installation Instructions Belleville Washer springs (Year: 2014).
Gibson, Daryl Lee; Non-Final Office Action for U.S. Appl. No. 16/428,744, filed May 31, 2019, mailed Aug. 2, 2021, 121 pgs.
Gibson, Daryl Lee; Notice of Allowance for U.S. Appl. No. 16/428,744, filed May 31, 2019, mailed Mar. 16, 2022, 34 pgs.
QRFS, Storz FDCs and fire Hydrant Storz connections: Adapters or integral Storz, Mar. 2019 (Year: 2019).
Speacialinsert, Inserts for plastic (Year: 2016).
Gibson, Daryl Lee; Applicant-Initiated Interview Summary for U.S. Appl. No. 17/245,419, filed Apr. 30, 2021, mailed Dec. 2, 2021, 2 pgs.
Gibson, Daryl Lee; Applicant-Initiated Interview Summary for U.S. Appl. No. 17/245,419, filed Apr. 30, 2021, mailed Mar. 8, 2022, 2 pgs.
Gibson, Daryl Lee; Final Office Action for U.S. Appl. No. 17/245,419, filed Apr. 30, 2021, mailed Oct. 25, 2021, 27 pgs.
Gibson, Daryl Lee; Final Office Action for U.S. Appl. No. 17/245,419, filed Apr. 30, 2021, mailed Apr. 8, 2022, 31 pgs.
Gibson, Daryl Lee; Non-Final Office Action for U.S. Appl. No. 17/245,419, filed Apr. 30, 2021, mailed Jan. 14, 2022, 27 pgs.
Gibson, Daryl Lee; Non-Final Office Action for U.S. Appl. No. 17/245,419, filed Apr. 30, 2021, mailed Sep. 2, 2021, 82 pgs.
Gibson, Daryl Lee; International Preliminary Report on Patentability for PCT Application No. PCT/US2016/067692, filed Dec. 20, 2016, mailed Aug. 23, 2018, 9 pgs.
Gibson, Daryl Lee; International Search Report and Written Opinion for PCT Application No. PCT/US2016/067692, filed Dec. 20, 2016, mailed Mar. 2, 2017, 10 pgs.
Gibson, Daryl Lee; Extended European Search Report for 16890115.5, filed Dec. 20, 2016, mailed Jan. 24, 2020, 10 pgs.
Gibson, Daryl Lee; Office Action for Canadian patent application No. 3,010,345, filed Dec. 20, 2016, mailed Oct. 6, 2020, 4 pgs.
Gibson, Daryl Lee; Office Action for Canadian patent application No. 3,010,345, filed Dec. 20, 2016, mailed Dec. 16, 2019, 4 pgs.
Gibson, Daryl Lee; Office Action for Canadian patent application No. 3,057,224, filed Oct. 1, 2019, mailed Nov. 10, 2020, 4 pgs.
Gibson, Daryl; Office Action for U.S Pat. No. 3,057,224, filed Oct. 1, 2019, mailed Jun. 23, 2021, 4 pgs.
Gibson, Daryl Lee; International Preliminary Report on Patentability for PCT Application No. PCT/US19/45451, filed Aug. 7, 2019, mailed Mar. 18, 2021, 8 pgs.
Gibson, Daryl Lee; International Search Report and Written Opinion for PCT Application No. PCT/US19/45451, filed Aug. 7, 2019, mailed Feb. 3, 2020, 11 pgs.

(56) References Cited

OTHER PUBLICATIONS

Gibson, Daryl Lee; Invitation to Pay Additional Fees for PCT/US19/45451, filed Aug. 7, 2019, mailed Oct. 10, 2019, 2 pgs.
Gibson, Daryl Lee; Office Action for Canadian patent application No. 3,057,167, filed Aug. 7, 2019, mailed Nov. 19, 2019, 7 pgs.
Gibson, Daryl Lee; Office Action for Canadian patent application No. 3,057,167, filed Aug. 7, 2019, mailed May 25, 2020, 3 pgs.
Gibson, Daryl Lee; Office Action for Canadian patent application No. 3,105,683, filed Aug. 7, 2019, mailed Mar. 8, 2022, 4 pgs.
Gibson, Daryl Lee; Extended European Search Report for application No. 19857477.4, filed Aug. 7, 2019, mailed Apr. 5, 2022, 7 pgs.
Gibson, Daryl Lee; Extended European Search Report for application No. 21180958.7, filed Aug. 7, 2019, mailed Oct. 5, 2021, 8 pgs.
Gibson, Daryl Lee; Office Action for Canadian application No. 3,057,202, filed Oct. 1, 2019, mailed Dec. 19, 2019, 3 pgs.
Gibson, Daryl Lee; Office Action for Canadian application No. 3,057,202, filed Oct. 1, 2019, mailed Apr. 2, 2020, 4 pgs.
Gibson, Daryl Lee; Office Action for Canadian application No. 3,057,202, filed Oct. 1, 2019, mailed Aug. 31, 2020, 4 pgs.
Gibson, Daryl Lee; U.S. Provisional Application entitled: Nozzle Cap Multi-Band Antenna Assembly having U.S. Appl. No. 62/294,973, filed Feb. 12, 2016, 54 pgs.
Gibson, Daryl Lee; International Search Report and Written Opinion for PCT Application No. PCT/US21/31033, filed May 6, 2021, mailed Sep. 24, 2021, 12 pgs.
Gibson, Daryl Lee; Invitation to Pay Additional Fees for PCT/US21/31033, filed May 6, 2021, mailed Jul. 15, 2021, 2 pgs.
Antenna. Merriam-Webster Dictionary, 2014 [retrieved on Jun. 1, 2014]. Retrieved from the Internet: <URL: www.merriam-webster.com/dictionary/antenna>.
Hyland, Gregory E., Non-Final Office Action for U.S. Appl. No. 13/101,235, filed May 5, 2011, mailed Jul. 31, 2013; 57 pgs.
Hyland, Gregory E.; Final Office Action for U.S. Appl. No. 13/101,235, filed May 5, 2011, mailed Feb. 20, 2014; 29 pgs.
Hyland, Gregory E.; Issue Notification for U.S. Appl. No. 13/101,235, filed May 5, 2011, mailed Dec. 23, 2014, 1 pg.
Hyland, Gregory E.; Non-Final Office Action for U.S. Appl. No. 13/101,235, filed May 5, 2011, mailed Jun. 5, 2014, 29 pgs.
Hyland, Gregory E.; Notice of Allowance for U.S. Appl. No. 13/101,235, filed May 5, 2011, mailed Sep. 11, 2014, 11 pgs.
Hyland, Gregory E.; Supplemental Notice of Allowability for U.S. Appl. No. 13/101,235, filed May 5, 2011, mailed Nov. 25, 2014, 5 pgs.
Hyland, Gregory E.; Applicant-Initiated Interview Summary for U.S. Appl. No. 14/557,754, filed Dec. 2, 2014, mailed Apr. 19, 2017, 4 pgs.
Hyland, Gregory E.; Final Office Action for U.S. Appl. No. 14/557,754, filed Dec. 2, 2014, mailed Apr. 5, 2017, 23 pgs.
Hyland, Gregory E.; Final Office Action for U.S. Appl. No. 14/557,754, filed Dec. 2, 2014, mailed Jun. 30, 2016, 24 pgs.
Hyland, Gregory E.; Non-Final Office Action for U.S. Appl. No. 14/557,754, filed Dec. 2, 2014, mailed Jan. 19, 2016, 101 pgs.
Hyland, Gregory E.; Non-Final Office Action for U.S. Appl. No. 14/557,754, filed Dec. 2, 2014, mailed Nov. 8, 2016, 48 pgs.
Hyland, Gregory E.; Notice of Allowance for U.S. Appl. No. 14/557,754, filed Dec. 2, 2014, mailed Jul. 17, 2017, 14 pgs.
Hyland, Gregory E.; Notice of Decision from Post-Prosecution Pilot Program (P3) Conference for U.S. Appl. No. 14/557,754, filed Dec. 2, 2014, mailed Sep. 14, 2016, 4 pgs.
Hyland, Gregory E.; Supplemental Notice of Allowability for U.S. Appl. No. 14/557,754, filed Dec. 2, 2014, mailed Oct. 20, 2017, 11 pgs.
Hyland, Gregory; Issue Notification for U.S. Appl. No. 14/557,754, filed Dec. 2, 2014, mailed Dec. 20, 2017, 1 pg.
Hyland, Gregory E.; Final Office Action for U.S. Appl. No. 14/848,676, filed Sep. 9, 2015, mailed Aug. 19, 2016; 20 pgs.
Hyland, Gregory E.; Issue Notification for U.S. Appl. No. 14/848,676, filed Sep. 9, 2015, mailed Dec. 6, 2017, 1 pg.
Hyland, Gregory E.; Non-Final Office Action for U.S. Appl. No. 14/848,676, filed Sep. 9, 2015, mailed Dec. 13, 2016, 52 pgs.
Hyland, Gregory E.; Notice of Allowance for U.S. Appl. No. 14/848,676, filed Sep. 9, 2015, mailed Sep. 6, 2017, 12 pgs.
Hyland, Gregory E.; Supplemental Notice of Allowability for U.S. Appl. No. 14/848,676, filed Sep. 9, 2015, mailed Nov. 27, 2017, 6 pgs.
Hyland, Gregory E.; Supplemental Notice of Allowability for U.S. Appl. No. 14/848,676, filed Sep. 9, 2015, mailed Sep. 19, 2017, 8 pgs.
Hyland, Gregory; Final Office Action for U.S. Appl. No. 14/848,676, filed Sep. 9, 2015, mailed Jun. 7, 2017, 25 pgs.
Hyland, Gregory; Non-Final Office Action for U.S. Appl. No. 14/848,676, filed Sep. 9, 2015, mailed Mar. 4, 2016, 94 pgs.
Hyland, Gregory E.; Final Office Action for U.S. Appl. No. 15/817,172, filed Nov. 18, 2017, mailed Jun. 11, 2020, 33 pgs.
Hyland, Gregory E.; Non-Final Office Action for U.S. Appl. No. 15/817,172, filed Nov. 18, 2017, mailed Dec. 17, 2019, 23 pgs.
Hyland, Gregory E.; Non-Final Office Action for U.S. Appl. No. 15/817,172, filed Nov. 18, 2017, mailed Jul. 10, 2019, 74 pgs.
Hyland, Gregory E.; Notice of Allowance for U.S. Appl. No. 15/817,172, filed Nov. 18, 2017, mailed Aug. 21, 2020, 9 pgs.
Hyland, Gregory E.; Supplemental Notice of Allowance for U.S. Appl. No. 15/817,172, filed Nov. 18, 2017, mailed Oct. 28, 2020, 4 pgs.
Hyland, Gregory E.; Supplemental Notice of Allowance for U.S. Appl. No. 15/817,172, filed Nov. 18, 2017, mailed Dec. 7, 2020, 4 pgs.
Hyland, Gregory; Supplemental Notice of Allowance for U.S. Appl. No. 15/817,172, filed Nov. 18, 2017, mailed Oct. 9, 2020, 4 pgs.
Hyland, Gregory E.; Final Office Action for U.S. Appl. No. 16/675,507, filed Nov. 6, 2019, mailed Jun. 26, 2020, 70 pgs.
Hyland, Gregory E.; Non-Final Office Action for U.S. Appl. No. 16/675,507, filed Nov. 6, 2019, mailed Jan. 28, 2020, 18 pgs.
Hyland, Gregory E.; Notice of Allowance for U.S. Appl. No. 16/675,507, filed Nov. 6, 2019, mailed Oct. 23, 2020, 16 pgs.
Hyland, Gregory E.; Supplemental Notice of Allowance for U.S. Appl. No. 16/675,507, filed Nov. 6, 2019, mailed Nov. 10, 2020, 4 pgs.
Hyland, Gregory E.; Non-Final Office Action for U.S. Appl. No. 17/071,632, filed Oct. 15, 2020, mailed Mar. 30, 2022, 89 pgs.
Fleury Jr., Leo W.; Non-Final Office Action for U.S. Appl. No. 13/492,790, filed Jun. 8, 2012, mailed Nov. 5, 2014, 30 pgs.
Fleury, Jr., Leo W.; Advisory Action for U.S. Appl. No. 13/492,790, filed Jun. 8, 2012, mailed Jul. 9, 2014, 3 pgs.
Fleury, Jr., Leo W.; Final Office Action for U.S. Appl. No. 13/492,790, filed Jun. 8, 2012, mailed Mar. 12, 2014; 19 pgs.
Fleury, Jr., Leo W.; Issue Notification for U.S. Appl. No. 13/492,790, filed Jun. 8, 2012, mailed Mar. 2, 2016, 1 pg.
Fleury, Jr., Leo W.; Non-Final Office Action for U.S. Appl. No. 13/492,790, filed Jun. 8, 2012, mailed Sep. 12, 2013; 37 pgs.
Fleury, Jr., Leo W.; Notice of Allowance for U.S. Appl. No. 13/492,790, filed Jun. 8, 2012, mailed Feb. 2, 2016, 9 pgs.
Fleury, Jr., Leo W.; Notice of Allowance for U.S. Appl. No. 13/492,790, filed Jun. 8, 2012, mailed May 12, 2015, 9 pgs.
Fleury, Jr., Leo W.; Notice of Allowance for U.S. Appl. No. 13/492,790, filed Jun. 8, 2012, mailed Sep. 23, 2015, 11 pgs.
Fleury, Leo W.; Applicant-Initiated Interview Summary for U.S. Appl. No. 14/870,070, filed Sep. 30, 2015, mailed Feb. 28, 2018, 4 pgs.
Fleury, Leo W.; Final Office Action for U.S. Appl. No. 14/870,070, filed Sep. 30, 2015, mailed Dec. 29, 2017, 24 pgs.
Fleury, Leo; Non-Final Office Action for U.S. Appl. No. 14/870,070, filed Sep. 30, 2015, mailed Jun. 21, 2017, 88 pgs.
Fleury Jr., Leo W., Advisory Action for U.S. Appl. No. 15/939,942, filed Mar. 29, 2018, mailed Dec. 7, 2021, 2 pgs.
Fleury, Jr., Leo W.; Final Office Action for U.S. Appl. No. 15/939,942, filed Mar. 29, 2018, mailed Nov. 25, 2020, 37 pgs.
Fleury, Jr., Leo W.; Final Office Action for U.S. Appl. No. 15/939,942, filed Mar. 29, 2018, mailed Feb. 19, 2020, 29 pgs.
Fleury, Jr., Leo W.; Non-Final Office Action for U.S. Appl. No. 15/939,942, filed Mar. 29, 2018, mailed Mar. 24, 2021, 32 pgs.
Hyland, Gregory E.; Australian Patent Examination Report for serial No. 2011265675, filed Jan. 21, 2012, mailed Oct. 1, 2014, 3 pgs.

(56) References Cited

OTHER PUBLICATIONS

Hyland, Gregory E.; Japanese Office Action for serial No. 2013515338, filed Jan. 30, 2012, mailed Jun. 10, 2014, 8 pgs.
Hyland, Gregory E.; Japanese Office Action for serial No. 2014-234642, filed May 5, 2011, mailed Nov. 4, 2015,9 pgs.
Hyland, Gregory E.; Japanese Office Action for serial No. 2014-234642, filed May 5, 2011, mailed Jul. 7, 2015, 9 pgs.
Hyland, Gregory E.; Australian Examination Report for serial No. 2015202550, filed May 5, 2011, mailed Feb. 9, 2017, 4 pgs.
Hyland, Gregory E.; Australian Examination Report for Serial No. 2015202550, filed May 5, 2011, mailed May 16, 2017, 5 pgs.
Hyland, Gregory E.; Australian Examination Report for Serial No. 2015202550, filed May 5, 2011, mailed Jul. 5, 2017, 4 pgs.
Hyland, Gregory E.; Australian Examination Report for serial No. 2015202550, filed May 5, 2011, mailed Aug. 12, 2016, 4 pgs.
Hyland, Gregory E.; Office Action for Mexico Patent Application No. MX/a/2017/006090, filed May 5, 2011, mailed Sep. 26, 2018, 4 pgs.
Hyland, Gregory E.; Examination Report for Australian patent application No. 2017248541, filed Oct. 20, 2017, mailed Apr. 20, 2018, 5 pgs.
Hyland, Gregory E.; Office Action for Canadian patent application No. 3,023,529, filed May 5, 2011, mailed Nov. 26, 2019, 4 pgs.
Keefe, Robert Paul, Office Action for Canadian application No. 3,060,512, filed May 5, 2011, mailed Apr. 22, 2020, 5 pgs.
Keefe, Robert Paul, Office Action for Canadian application No. 3,060,512, filed May 5, 2011, mailed Jul. 13, 2020, 6 pgs.
Fleury, Leo W.; International Preliminary Report on Patentability for serial No. PCT/US12/50390 filed Aug. 10, 2012, mailed Feb. 18, 2014, 14 pgs.
Fleury, Leo W.; International Search Report and Written Opinion for serial No. PCT/US12/50390 filed Aug. 10, 2012, mailed Dec. 17, 2012, 18 pgs.
Fleury Jr., Leo W.; European Search Report for U.S. Appl. No. 12/823,594, filed Aug. 10, 2012, mailed Dec. 21, 2017, 4 pgs.
Fleury Jr., Leo W.; European Search Report for U.S. Appl. No. 12/823,594, filed Aug. 10, 2012, mailed May 10, 2017, 4 pgs.
Fleury Jr., Leo W.; European Search Report for U.S. Appl. No. 12/823,594, filed Aug. 10, 2012, mailed Jun. 8, 2015, 11 pgs.
Fleury, Leo W.; Office Action for Canadian application No. 2,842,042, filed Aug. 10, 2012, mailed Feb. 28, 2019, 3 pgs.
Fleury, Leo W.; Office Action for Canadian application No. 2,842,042, filed Aug. 10, 2012, mailed Apr. 24, 2018, 3 pgs.
Fleury, Leo W.; Office Action for Canadian patent application No. 2,842,042, filed Aug. 10, 2012, mailed 12/5/82019, 3 pgs.
Fleury, Leo W., Jr.; Office Action for Canadian patent application No. 3, 102,529, filed Aug. 10, 2012, mailed Mar. 16, 2022, 4 pgs.
Fleury, Leo W., U.S. Provisional Patent Application Entitled: Hydrant Leak Detector Communication Device, System, and Method under U.S. Appl. No. 61/523,274, filed Aug. 12, 2011; 35 pgs.
Hunaidi, Osama; Issue Notification for U.S. Appl. No. 11/766,288, filed Jun. 21, 2007, mailed Sep. 22, 2010, 1 pg.
Hunaidi, Osama; Non-Final Office Action for U.S. Appl. No. 11/766,288, filed Jun. 21, 2007, mailed Jan. 20, 2010, 50 pgs.
Hunaidi, Osama; Notice of Allowance for U.S. Appl. No. 11/766,288, filed Jun. 21, 2007, mailed Jun. 24, 2010, 8 pgs.
Hunaidi, Osama; Non-final Office Action for U.S. Appl. No. 09/482,317, filed Jan. 14, 2000, mailed Dec. 17, 2001, 6 pgs.
Hunaidi, Osama; Notice of Allowance for U.S. Appl. No. 09/482,317, filed Jan. 14, 2000, mailed May 13, 2002, 4 pgs.
Peter, Russo Anthony; European Search Report for Patent Application No. EP95307807, filed Nov. 1, 1995, mailed Jul. 22, 1998, 5 pgs.
Ortiz, Jorge Isaac; Final Office Action for U.S. Appl. No. 15/043,057, filed Feb. 12, 2016, mailed Dec. 12, 2018, 25 pgs.
Ortiz, Jorge Isaac; Issue Notification for U.S. Appl. No. 15/043,057, filed Feb. 12, 2016, mailed Apr. 17, 2019, 11 pg.
Ortiz, Jorge Isaac; Non-Final Office Action for U.S. Appl. No. 15/043,057, filed Feb. 12, 2016, mailed Jun. 4, 2018, 94 pgs.
Ortiz, Jorge Isaac; Notice of Allowance for U.S. Appl. No. 15/043,057, filed Feb. 12, 2016, mailed Feb. 19, 2019, 8 pgs.
Ortiz, Jorge Isaac; Supplemental Notice of Allowance for U.S. Appl. No. 15/043,057, filed Feb. 12, 2016, mailed Mar. 13, 2019, 6 pgs.
Ortiz, Jorge Isaac; Final Office Action for U.S. Appl. No. 16/354,939, filed Mar. 15, 2019, mailed Mar. 17, 2022, 40 pgs.
Ortiz, Jorge Isaac; Non-Final Office Action for U.S. Appl. No. 16/354,939, filed Mar. 15, 2019, mailed Aug. 10, 2021, 126 pgs.
Ortiz, Jorge Isaac; Final Office Action for U.S. Appl. No. 17/245,181, filed Apr. 30, 2021, mailed Dec. 7, 2021, 28 pgs.
Ortiz, Jorge Isaac; Non-Final Office Action for U.S. Appl. No. 17/245,181, filed Apr. 30, 2021, mailed Sep. 16, 2021, 82 pgs.
Ortiz, Jorge Isaac; Notice of Allowance for U.S. Appl. No. 17/245,181, filed Apr. 30, 2021, mailed Mar. 7, 2022, 13 pgs.
Ortiz, Jorge Isaac; Requirement for Restriction/Election for U.S. Appl. No. 17/245,181, filed Apr. 30, 2021, mailed Jul. 22, 2021, 6 pgs.
Ortiz, Jorge Isaac; International Preliminary Report on Patentability for PCT Application No. PCT/US2016/067689, filed Dec. 20, 2016, mailed Aug. 23, 2018, 8 pgs.
Ortiz, Jorge; International Search Report and Written Opinion for PCT/US16/67689, filed Dec. 20, 2016, mailed Mar. 8, 2017, 9 pgs.
Ortiz, Jorge Isaac; Extended European Search Report for serial No. 16890114.8, filed Dec. 20, 2016, mailed Sep. 26, 2019, 11 pgs.
Ortiz, Jorge Isaac; Office Action for European patent application No. 16890114.8, filed Dec. 20, 2016, mailed Oct. 4, 2021, 7 pgs.
Ortiz, Jorge Isaac; Office Action for Canadian patent application No. 3,010,333, filed Dec. 20, 2016, mailed Dec. 6, 2019, 4 pgs.
Oritz, Jorge Isaac; Office Action for Canadian patent application No. 3,070,690, filed Dec. 20, 2016, mailed Mar. 10, 2020, 3 pgs.
Ortiz, Jorge Isaac; Office Action for Canadian patent application No. 3,095,465, filed Dec. 20, 2016, mailed Nov. 8, 2021, 4 pgs.
Gibson, Daryl Lee; Corrected Notice of Allowance for U.S. Appl. No. 15/255,795, filed Sep. 2, 2016, mailed Mar. 21, 2019, 6 pgs.
Gibson, Daryl Lee; Final Office Action for U.S. Appl. No. 15/255,795, filed Sep. 2, 2016, mailed Aug. 31, 2018, 33 pgs.
Gibson, Daryl Lee; Non-Final Office Action for U.S. Appl. No. 15/255,795, filed Sep. 2, 2016, mailed Feb. 23, 2018, 86 pgs.
Fleury, et al.; Supplemental European Search Report for application No. 12823594.2, filed Aug. 20, 2012, mailed Feb. 18, 2015, 6 pgs.
J.A. Gallego-Juarez, G. Rodriguez-Corral and L. Gaete-Garreton, An ultrasonic transducer for high power applications in gases, Nov. 1978, Ultrasonics, published by IPC Business Press, p. 267-271.
Non-Patent Literature “Radiodetection Water Leak Detection Products”, 2008, Radiodetection Ltd. - SPX Corporation.
Non-Patent Literature Bimorph (entitled “Bimoprh actuators”), accessed at http://web.archive.org/web/20080122050424/http://www.elpapiezo.ru/eng/curve_e.shtml, archived on Jan. 22, 2008.
Non-Patent Literature Murata (entitled “Piezoelectric Sounds Components”), accessed at http:/web.archive.org/web/20030806141815/http://www.murata.com/catalog/p37e17.pdf, archived on Aug. 6, 2003.
Non-Patent Literature NerdKits, accessed at http://web.archive.org/web/20090510051850/http://www.nerdkits.com/videos/sound_meter/, archived on May 10, 2009.
Fleury, Jr., Leo W.; Office Action for Canadian patent application No. 3,161,900, filed Aug. 10, 2012, mailed Aug. 28, 2023, 3 pgs.
Fleury, Jr., Leo W.; Office Action for Canadian patent application No. 3, 161,913, filed Aug. 10, 2012, mailed Aug. 22, 2023, 4 pgs.
Ortiz, Jorge Isaac; Office Action for European patent application No. 16890114.8, filed Dec. 20, 2016, mailed Sep. 11, 2023, 7 pgs.
Gibson, Daryl Lee; Office Action for European patent application No. 19857477.4, filed Aug. 7, 2019, mailed Jul. 31, 2023, 3 pgs.
Hyland, Gregory E.; Final Office Action for U.S. Appl. No. 18/070,154, filed Nov. 28, 2022, mailed Aug. 13, 2025, 10 pgs.
Ortiz, Jorge Isaac; Final Office Action for U.S. Appl. No. 18/219,826, filed Jul. 10, 2023, mailed Aug. 26, 2025, 16 pgs.
Gibson, Daryl Lee; Notice of Allowance for Canadian Patent Application No. 3,177,216, filed Dec. 20, 2016, mailed Sep. 5, 2025, 1 pg.

(56) References Cited

OTHER PUBLICATIONS

Hyland, Gregory E.; Notice of Allowance for U.S. Appl. No. 18/070,154, filed Nov. 28, 2022, mailed Oct. 15, 2025, 7 pgs.

* cited by examiner

NOZZLE CAP ENCAPSULATED ANTENNA SYSTEM

CROSS-REFERENCE TO RELATED APPLICATIONS

This application is a continuation of U.S. patent application Ser. No. 16/234,715, filed Dec. 28, 2018, which is hereby incorporated by reference in its entirety.

TECHNICAL FIELD

This disclosure relates to nozzle caps. More specifically, this disclosure relates to a nozzle cap of a fire hydrant which is configured to wirelessly transmit a signal.

BACKGROUND

Some fluid systems, such as water distribution systems, can comprise fire hydrants which can be attached to legs of the fluid system, such as a water main. Fire hydrants typically have one or more nozzles sealed with a nozzle cap. In an Advanced Metering Infrastructure, the fire hydrants can be configured to wirelessly transmit data. For example, the nozzle cap of a fire hydrant can contain a vibration sensor configured to detect leaks within the fluid system, and information about the presence or absence of leaks can be wirelessly transmitted to an agency tasked with managing and maintaining the water distribution system. However, nozzle caps configured to wirelessly transmit information can contain delicate electronics which can easily be damaged by impacts, as nozzle caps commonly experience. Additionally, the fire hydrants and nozzle caps are commonly made of metal which can interfere with wireless transmission of a signal from within a nozzle cap.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a method for manufacturing a nozzle cap, the method comprising: attaching an antenna printed circuit board ("PCB") strip to an inner cover surface of an antenna cover; and inserting the antenna cover into a scallop defined by a circumferential wall of a cap body to position the antenna PCB strip between the antenna cover and the circumferential wall, the circumferential wall defining an outer wall surface, the antenna cover covering the scallop, the scallop extending radially inward into the circumferential wall relative to a first portion and a second portion of the outer wall surface, the scallop circumferentially positioned between the first portion and the second portion of the outer wall surface.

Also disclosed is a nozzle cap comprising: a cap body defining a circumferential wall, the circumferential wall defining an outer wall surface, a scallop defined extending into the circumferential wall relative to a first portion and a second portion of the outer wall surface, the scallop circumferentially positioned between the first portion and the second portion of the outer wall surface; an antenna cover positioned within the scallop, the antenna cover secured to the cap body by at least one pin; and an antenna printed circuit board ("PCB") strip positioned within an antenna cavity defined between the antenna cover and the circumferential wall.

Also disclosed is a method for manufacturing a nozzle cap, the method comprising: positioning a first antenna cover in a first scallop of a circumferential wall of a cap body with a first antenna printed circuit board ("PCB") strip positioned between the first antenna cover and the circumferential wall, the circumferential wall defining an outer wall surface, the first scallop extending inwards relative to a first portion and a second portion of the outer wall surface, the first scallop circumferentially positioned between the first portion and the second portion of the outer wall surface; and positioning a second antenna cover in a second scallop of the circumferential wall with a second antenna PCB strip positioned between the second antenna cover and the circumferential wall.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
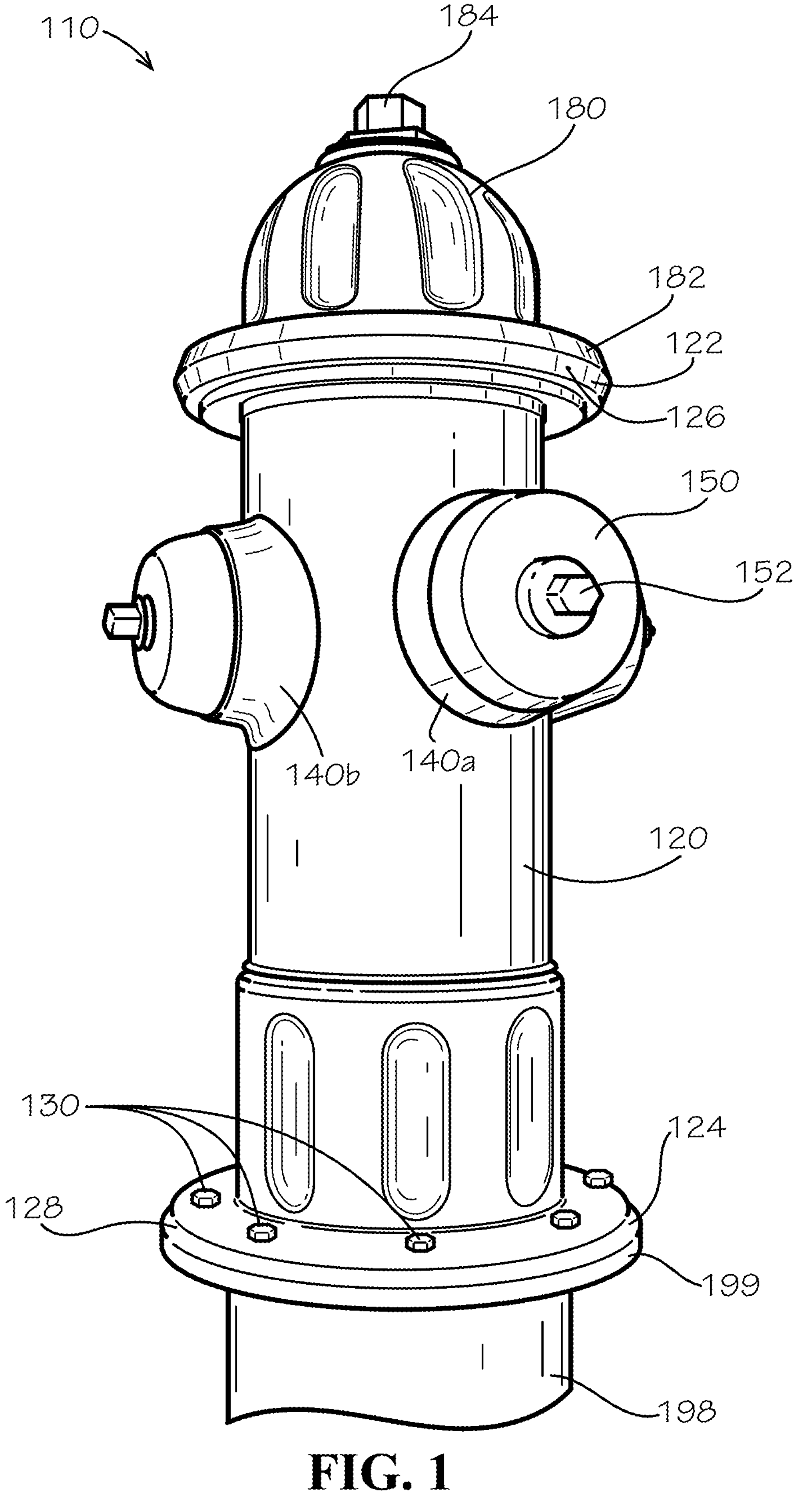
FIG. 1 is a perspective view of a fire hydrant comprising a barrel, a nozzle cap, and a bonnet in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a nozzle cap and associated methods, systems, devices, and various apparatus. The nozzle cap can comprise a cap body, a pair of antenna printed circuit boards ("PCBs") strips, and a pair of antenna covers. It would be understood by one of skill in the art that the disclosed nozzle cap is described in but a few exemplary aspects among many. No particular terminology or description should be considered limiting on the disclosure or the scope of any claims issuing therefrom.

FIG. 1 is a perspective view of a fire hydrant 110 comprising a barrel 120, a nozzle cap 150, and a bonnet 180. The barrel 120 can define a top barrel end 122 and a bottom barrel end 124 disposed opposite from the top barrel end 122. The barrel 120 can be substantially tubular. The barrel 120 can comprise a top flange 126 disposed at the top barrel end 122 and a base flange 128 disposed at the bottom barrel end 124. The base flange 128 can be fastened to a stand pipe flange 199 of a stand pipe 198 of a fluid system (not shown), such as a water main for example and without limitation. The base flange 128 can be fastened to the stand pipe flange 199 by a plurality of fasteners 130. A bonnet flange 182 of the bonnet 180 can be attached to the top flange 126 of the barrel 120, such as with a plurality of fasteners (not shown) similar to the fasteners 130. The bonnet 180 can comprise an operation nut 184, or "op nut", which can be rotated to open and close a main valve (not shown) positioned at the bottom barrel end 124 or below in the stand pipe 198 in order to respectively supply or cut off pressurized water supply to the fire hydrant 110.

The barrel 120 can define one or more nozzles 140*a,b*. The nozzle cap 150 can be screwed onto the nozzle 140*a* to seal the nozzle 140*a*. With the nozzle cap 150 sealing the nozzle 140*a*, pressurized water cannot escape through the nozzle 140*a* when the main valve (not shown) is in an open position. The nozzle cap 150 can define a cap nut 152 which can be turned, such as with a wrench, to tighten or loosen the nozzle cap 150 on the nozzle 140*a*.

Figure 2:
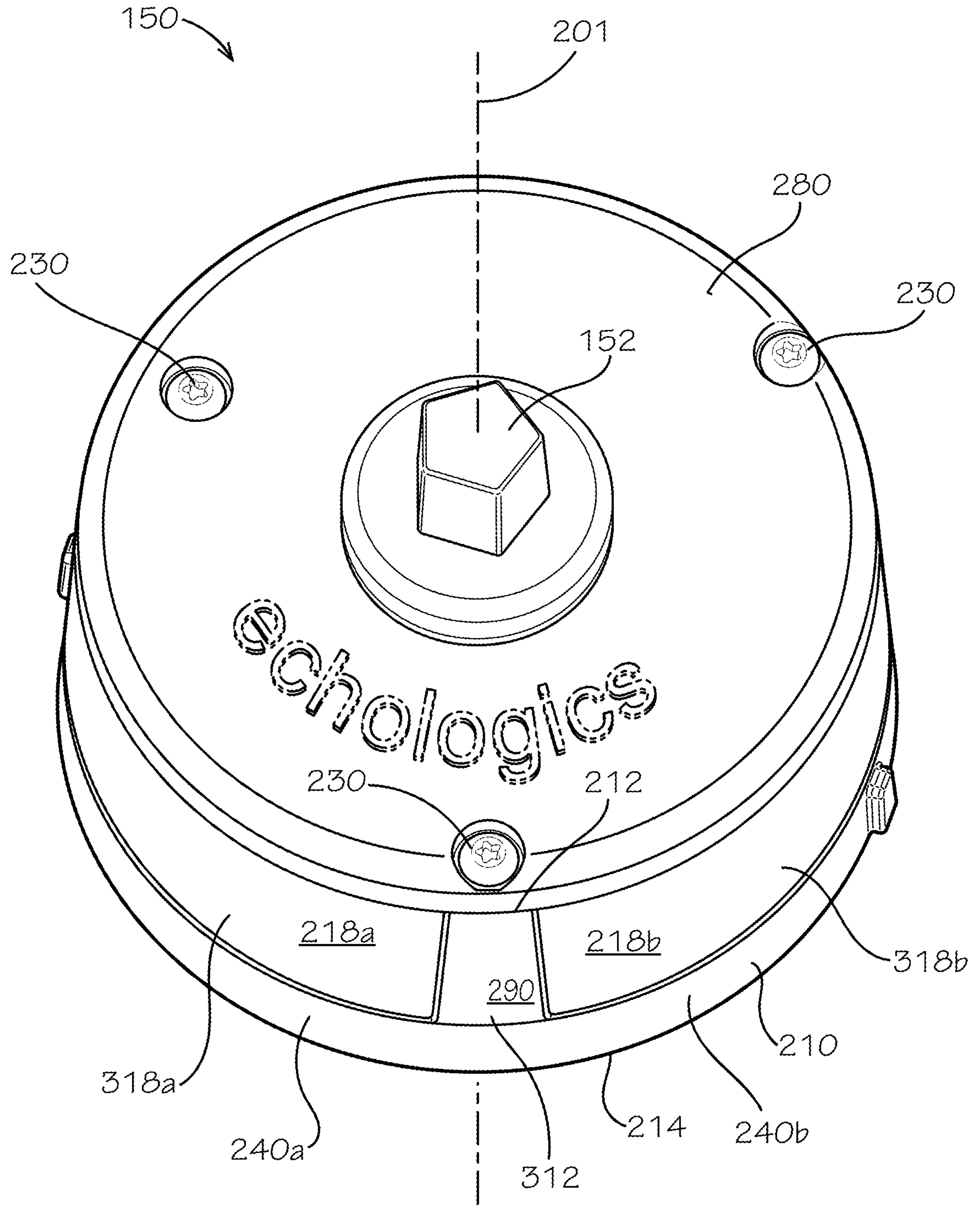
FIG. 2 is a front perspective view of the nozzle cap of FIG. 1 comprising a cap body and a cap cover attached to the cap body by fasteners.

FIG. 2 is a perspective front view of the nozzle cap 150 of the fire hydrant 110 of FIG. 1. The nozzle cap 150 can comprise a cap body 210, a cap cover 280, and a pair of antenna covers 318*a,b*. The cap body 210 can define a first body end 212 and a second body end 214, and the first body end 212 can be disposed opposite from the second body end 214. The cap body 210 can define a cap axis 201 extending from the first body end 212 to the second body end 214. The cap axis 201 can extend through the cap nut 152 such that rotating the nozzle cap 150 by turning the cap nut 152, such as with a wrench, can rotate the nozzle cap 150 about the cap axis 201.

The cap body 210 can define a pair of bottom shelves 240*a,b* at the second body end 214. Each bottom shelf 240*a,b* can respectively be positioned beneath a different one of the antenna covers 318*a,b* with respect to the present viewing angle. The cap cover 280 can be secured to the first body end 212 by a plurality of fasteners 230. The bottom shelves 240*a,b* and the cap cover 280 can radially overlap with each of the antenna covers 318*a,b*, respectively, to axially secure each antenna cover 318*a,b* between the respective bottom shelf 240*a,b* and the cap cover 280 relative to the cap axis 201.

The cap body 210 can also define a circumferential wall 312 extending from the first body end 212 towards the second body end 214, and each antenna cover 318*a,b* can circumferentially overlap a different portion of the circumferential wall 312. In the present aspect, each antenna cover 318*a,b* can respectively define an outer cover surface 218*a, b*, and the circumferential wall 312 can define an outer wall surface 290. In the present aspect, each of the outer cover surfaces 218*a,b* can be positioned flush with the outer wall surface 290.

Figure 3:
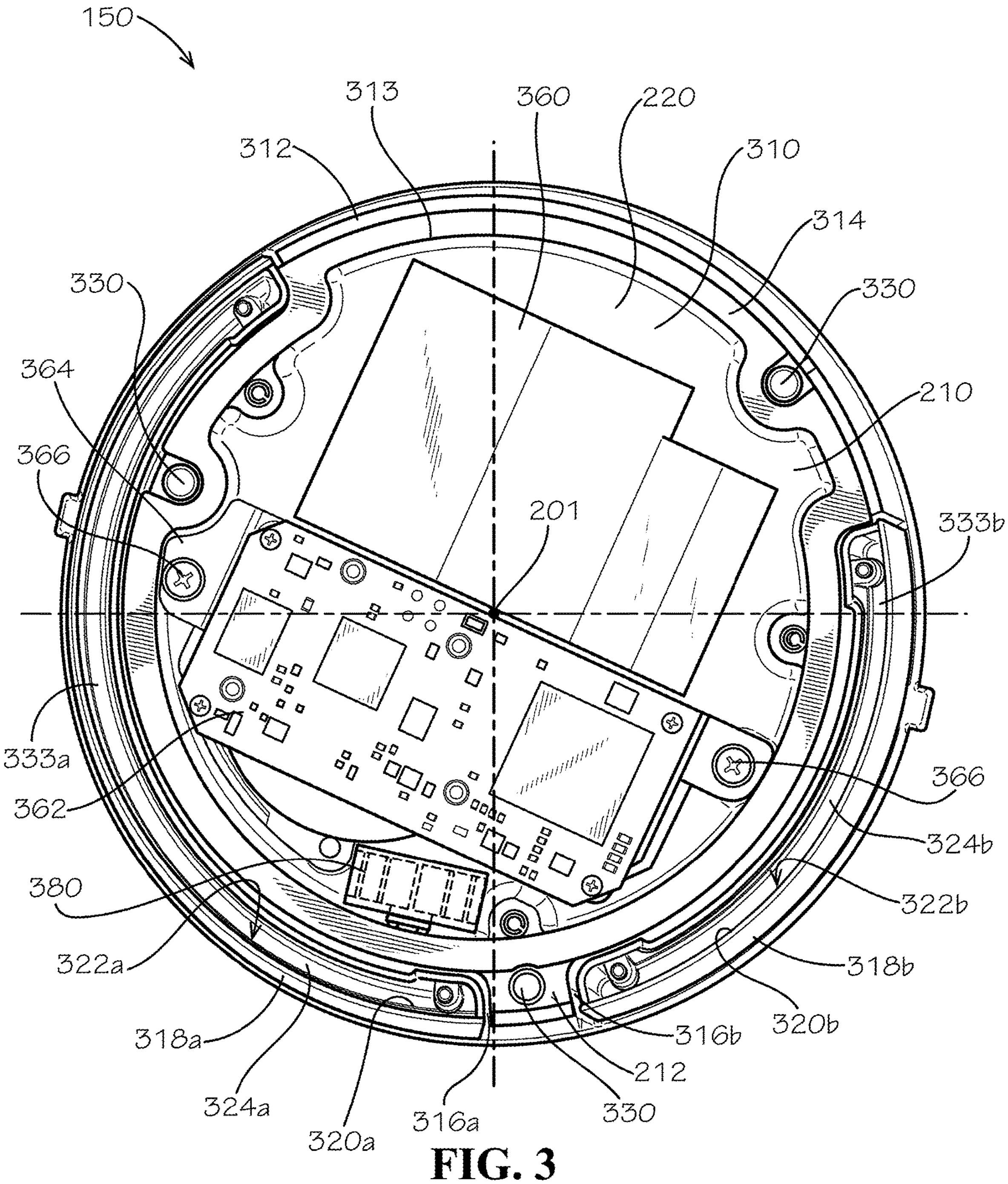
FIG. 3 is a front view of the nozzle cap of FIG. 1 facing a first body end of the cap body with the cap cover and the fasteners removed.

FIG. 3 is a front view of the nozzle cap 150 of FIG. 1 facing the first body end 212 with the cap cover 280 (shown in FIG. 2) and fasteners 230 (shown in FIG. 2) removed to expose a cavity 310 within the cap body 210. The cap body 210 can define fastener holes 330 configured to receive the fasteners 230 to secure the cap cover 280 to the cap body 210. The cavity 310 can extend inwards into the cap body 210 from the first body end 212 to an inner wall 220 of the cap body 210. As shown, the circumferential wall 312 can extend around a circumference of the cap body 210, and the circumferential wall 312 can partially enclose the cavity 310. A cavity opening 313 to the cavity 310 can be defined at the first body end 212, and a cavity gasket 314 can extend around the cavity opening 313. The cavity gasket 314 can be configured to seal with the cap cover 280 (shown in FIG. 2) to enclose the cavity 310.

As previously discussed, the antenna covers 318*a,b* can circumferentially overlap portions of the circumferential wall 312. In the present aspect, the portions can be scalloped portions defined by external scallops 316*a,b*, respectively. The external scallops 316*a,b* can extend axially inward into the outer wall surface 290 of the circumferential wall 312 relative to the cap axis 201, shown extending out of the page. As shown, the antenna covers 318*a,b* can fit within the external scallops 316*a,b*, respectively.

The nozzle cap 150 can further comprise a pair of antenna printed circuit boards ("PCBs") 320*a,b* which can be respectively enclosed within each of the external scallops 316*a,b* between the respective antenna cover 318*a,b* and the circumferential wall 312. Each antenna cover 318*a,b* can define an inner cover surface 322*a,b*, respectively, which can face the circumferential wall 312. An antenna cavity 324*a,b* can respectively be defined between each of the inner cover surfaces 322*a,b* and the scalloped portions of the circumferential wall 312 defined by the external scallops 316*a,b*. The antenna covers 318*a,b* can each partially enclose the respective antenna cavity 324*a,b*. In the present aspect, the antenna PCB strips 320*a,b* can be secured in facing engagement with the inner cover surface 322*a,b*.

The nozzle cap 150 can further comprise a pair of spacer strips 326*a,b* (shown in FIG. 4) disposed within the respective antenna cavity 324*a,b*. The spacer strips 326*a,b* can be positioned between the respective antenna cover 318*a,b* and the circumferential wall 312, and the spacer strips 326*a,b* can be in facing engagement with the adjacent antenna cover 318*a,b* and the circumferential wall 312. In the present aspect, the spacer strips 326*a,b* can comprise an adhesive which can be bonded to either or both of the respective antenna cover 318*a,b* and the circumferential wall 312. In the present aspect, the spacer strips 326*a,b* can comprise a compressible material, such as foam, rubber, an elastomer, or any other suitable material. The spacer strips 326*a,b* can be compressed by the respective antenna covers 318*a,b*, thereby forming a seal between the antenna covers 318*a,b* and the circumferential wall 312.

The antenna PCB strips 320*a,b* can be attached to the inner cover surface 322*a,b* of the respective antenna cover 318*a,b*, such as with an adhesive, a tape, or a mechanical fastener, such as hook-and-loop strips, a screw, a bolt, a snap, or any other suitable attachment mechanism. In some aspects, the antenna PCB strips 320*a,b* can be positioned atop a bottom cover surface 333*a,b* of the respective antenna covers 318*a,b*. The bottom cover surfaces 333*a,b* can be defined within the respective antenna cavities 324*a,b*.

The spacer strips 326*a,b* can primarily act as a temporary sealing mechanism for filling the antenna cavities 324*a,b* with a potting material. With any gaps between the antenna covers 318*a,b* and the circumferential wall 312 sealed by the spacer strips 326*a,b*, potting can be poured into each antenna cavity 324*a,b* in a liquid or amorphous form, and the potting can be allowed to cure. The potting can permanently seal the respective antenna cavity 324*a,b*, and the potting can permanently secure each antenna PCB strip 320*a,b* in facing engagement with the inner cover surface 322*a,b*. The potting can secure the antenna PCB strips 320*a,b* permanently in position in a manner which resists vibration and impact.

The potting can at least partially be positioned between the antenna PCB strips 320*a,b* and the circumferential wall 312. In some aspects, the circumferential wall 312 can interfere with transmissions from the antenna PCB strips 320*a,b*. The potting can maintain a constant gap between the circumferential wall 312 and the respective antenna PCB strips 320*a,b*, therefore providing consistent transmission tuning of the antenna PCB strip 320*a,b*. The potting can also seal out moisture, debris, and other foreign matter which could enter the antenna cavities 324*a,b* and interfere with the operation of the antenna PCB strips 320*a,b*. By attaching the antenna PCB strips 320*a,b* to the respective inner cover surfaces 322*a,b*, the gap between the circumferential wall 312 and the antenna PCB strips 320*a,b* can be maximized to reduce potential interference.

The nozzle cap 150 can comprise a battery pack 360, a processing printed circuit board ("PCB") 362, and a vibration sensor 380 disposed within the cavity 310. The processing PCB 362 can be attached to a mounting bracket 364 which can be secured within the cavity 310 by a pair of fasteners 366. The vibration sensor 380 can be attached to the circumferential wall 312 within the cavity 310, and the vibration sensor 380 can extend radially inward towards the cap axis 201 (shown extending out of the page).

The battery pack 360, the processing PCB 362, the vibration sensor 380, and the antenna PCB strips 320*a,b* can all be connected in electrical communication. The vibration sensor 380 can be configured to detect leaks within the fluid system (not shown) by monitoring vibrations travelling up the stand pipe 198 (shown in FIG. 1) and through the fire hydrant 110 (shown in FIG. 1) when the nozzle cap 150 is mounted on the nozzle 140*a* (shown in FIG. 1). Vibration patterns within the fluid system can indicate the presence of leaks within the fluid system. The vibration sensor 380 can produce voltage readings when the vibration sensor 380 experiences vibrations. These voltage readings can be processed by the processing PCB 362 to determine whether leaks are present, and a signal can be transmitted outwards from the nozzle cap 150 with the antenna PCB strips 320*a,b* to convey whether leaks have been identified within the fluid system.

Figure 4:
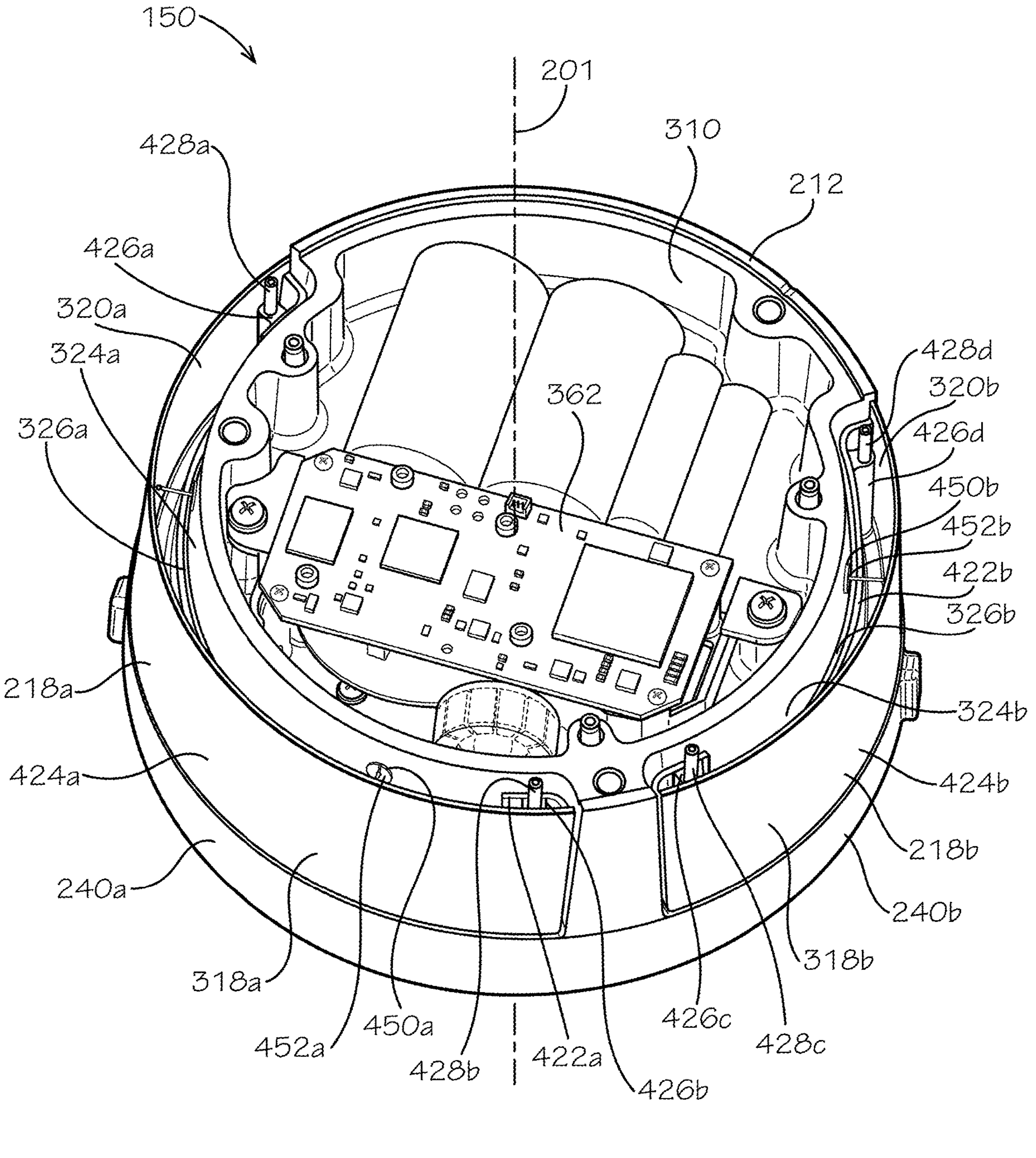
FIG. 4 is a front perspective view of the nozzle cap of FIG. 1, with a cavity gasket of the nozzle cap additionally removed.
Figure 5:
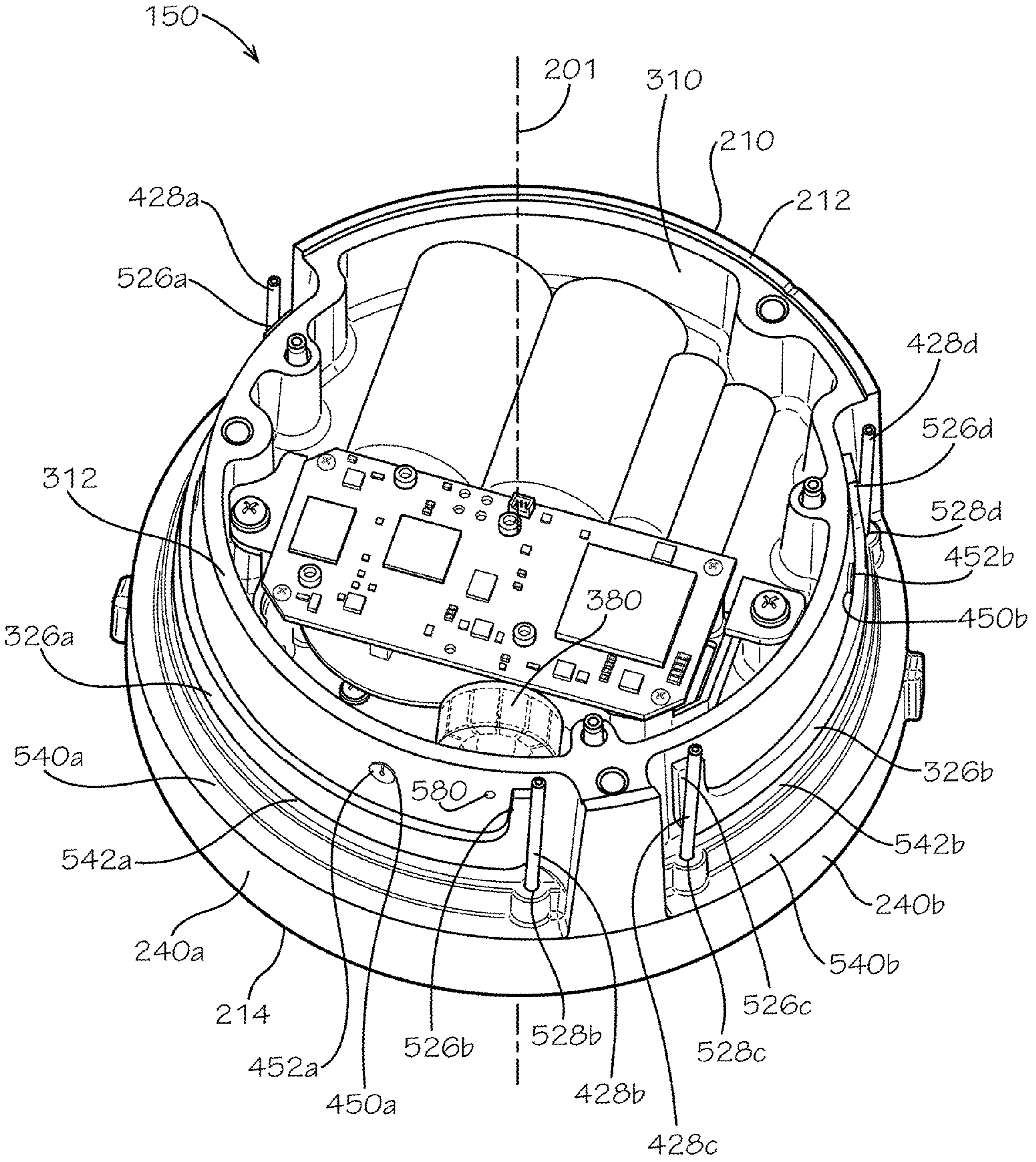
FIG. 5 is a front perspective view of the nozzle cap of FIG. 1, with the antenna covers and the antenna printed circuit board ("PCB") strips of the nozzle cap additionally removed.

FIG. 4 is a front perspective view of the nozzle cap 150 of FIG. 1 with the cap cover 280 (shown in FIG. 2), and the cavity gasket 314 (shown in FIG. 3) removed. As shown, each of the antenna covers 318*a,b* can comprise an inner layer 422*a,b*, respectively, and an outer layer 424*a,b*, respectively. The inner layers 422*a,b* can define a wide U-shape which can be shaped complimentary to the spacer strips 326*a,b* as illustrated in FIG. 5. The outer layers 424*a,b* can respectively define the inner cover surfaces 322*a,b* (as shown below in FIG. 8), and the outer layers 424*a,b* can define the outer cover surfaces 218*a,b*, respectively. The inner cover surfaces 322*a,b* can be defined opposite from the outer cover surfaces 218*a,b*. Each antenna cover 318*a,b* can comprise a pair of pin guides 426*a*—d, and the pin guides 426*a*—d can be positioned between the adjacent inner layers 422*a,b* and outer layers 424*a,b*, respectively. The antenna PCB strips 320*a,b* can extend between the respective pin guides 426*a*—d and outer layers 424*a,b*.

A pin 428*a*—d can extend through each of the pin guides 426*a*—d, and the pins 428*a*—d can be attached to the respective bottom shelves 240*a,b*. The antenna covers 318*a,b* can slide axially with respect to the cap axis 201 along the pins 428*a*—d to install or remove the antenna covers 318*a,b* from the cap body 210. When the cap cover 280 (shown in FIG. 2) is attached to the first body end 212, the antenna covers 318*a,b* can be axially secured between the cap cover 280 and the bottom shelves 240*a,b*, thereby preventing removal of the antenna covers 318*a,b* from the cap body 210. Additionally, the cap cover 280 can fully enclose the antenna cavities 324*a,b* proximate to the first body end 212.

The antenna PCB strips 320*a,b* can be connected to the processing PCB 362 by wires passing through wire ports 450*a*—c (wire port 450*c* shown in FIG. 8) can be exposed. In the present aspect, the wires can be coaxial cable feedlines. The wire ports 450*a*—c can extend through the circumferential wall 312 from the respective antenna cavity 324*a,b* to the cavity 310. Each of the wire ports 450*a*—c can be sealed with a plug 452*a*—c (plug 452*c* shown in FIG. 8), respectively. The plugs 452*a*—c can be split plugs configured to accommodate a wire (not shown) of the respective antenna PCB strip 320*a,b*. The wires of the antenna PCB strips 320*a,b* can extend through the plugs 452*a*—c and through the wire ports 450*a*—c into the cavity 310 to connect the antenna PCB strips 320*a,b* to the processing PCB 362. The plugs 452*a*—c can seal the wire ports 450*a*—c around the wires. In the present aspect, the plugs 452*a*—c can primarily serve as a temporary sealing mechanism for when the potting is poured into the antenna cavities 324*a,b*, respectively. Once the potting has cured within the antenna cavities 324*a,b*, each antenna cavity 324*a,b* can be fully sealed against the elements, dirt, water, or any other foreign matter.

FIG. 5 is a front perspective view of the nozzle cap 150 with the cap cover 280 (shown in FIG. 2), the cavity gasket 314 (shown in FIG. 3), the antenna PCB strips 320*a,b* (shown in FIG. 3), the coaxial cable feedlines, and the antenna covers 318*a,b* (shown in FIG. 3) removed. With the antenna PCB strips 320*a,b* and the antenna covers 318*a,b* removed, the wire ports 450*a,b* and plugs 452,*a,b* can be exposed. As shown, each of the bottom shelves 240*a,b* can each respectively define a lower shelf surface 540*a,b* and an upper shelf surface 542*a,b* positioned above the lower shelf surface 540*a,b*. In the present aspect, each spacer strip 326*a,b* can rest upon the respective upper shelf surface 542*a,b*. As described above, the spacer strips 326*a,b* can define a wide U-shape wherein opposing ends 526*a*—d of each respective spacer strip 326*a,b* extend upwards towards the first body end 212.

Figure 6:
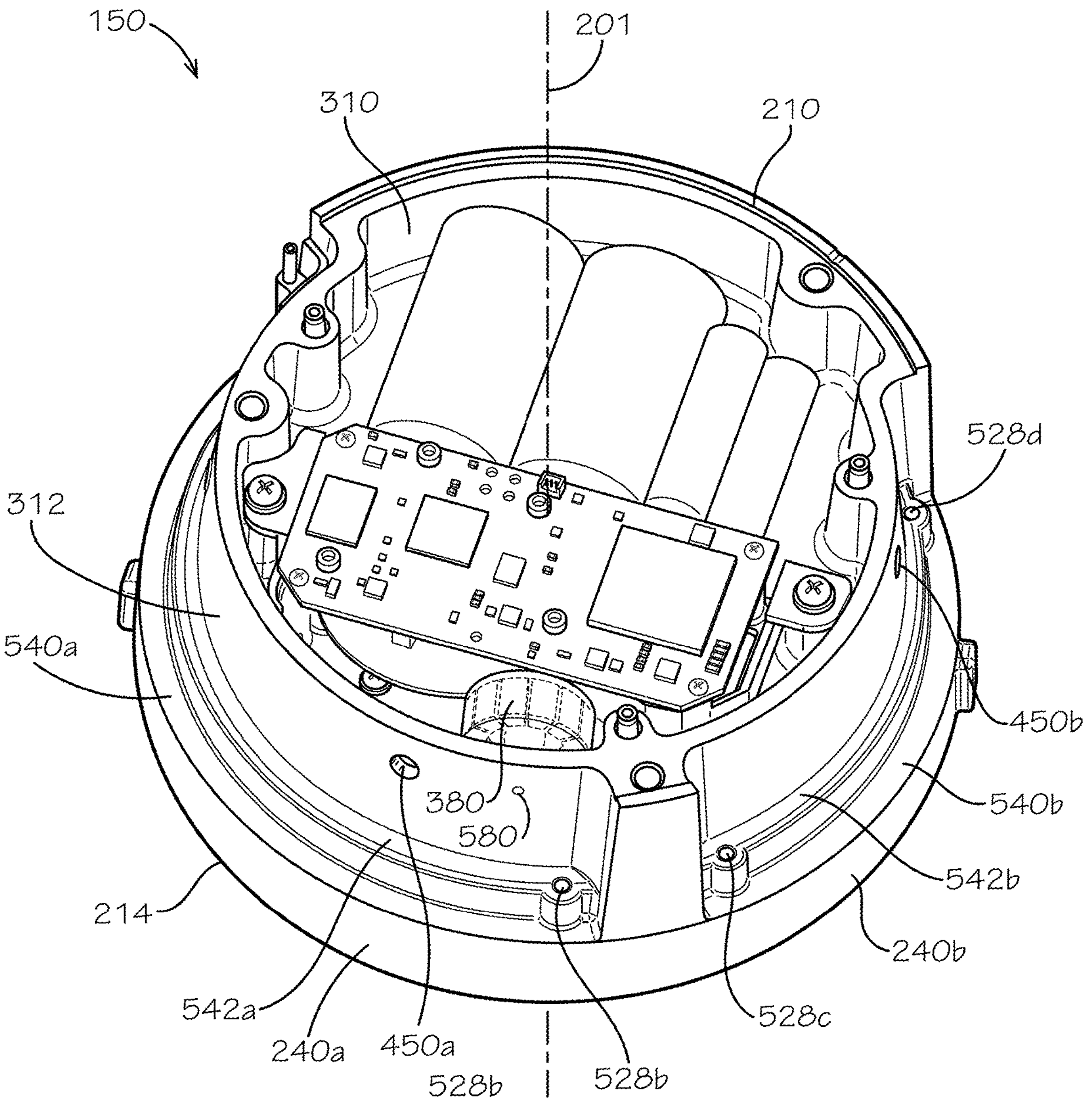
FIG. 6 is a front perspective view of the nozzle cap of FIG. 1, with the spacer strips, the plugs, and the pins of the nozzle cap additionally removed.

The cap body 210 can define pin holes 528*b*—d corresponding to pins 428*b*—d. A pin hole corresponding to pin 428*a* can also be defined but is not shown in the present view; however, pin holes 528*b*—d can be representative of the pin hole of pin 528*a*. The pin holes 528*b*—d can extend axially downward into the upper shelf surface 542*a,b* and towards the second body end 214 relative to the cap axis 201, as shown in FIGS. 5 and 6. The pins 428*b*—d can be received within the pin holes 528*b*—d, and the pins 428*b*—d can be aligned substantially parallel to the cap axis 201.

The cap body 210 can also define a threaded bore 580 which can extend through the circumferential wall 312 substantially perpendicular to the cap axis 201. A threaded end 780 (shown in FIG. 7) of the vibration sensor 380 can threadedly engage the threaded bore 580 to attach the vibration sensor 380 to the circumferential wall 312 within the cavity 310.

Figure 7:
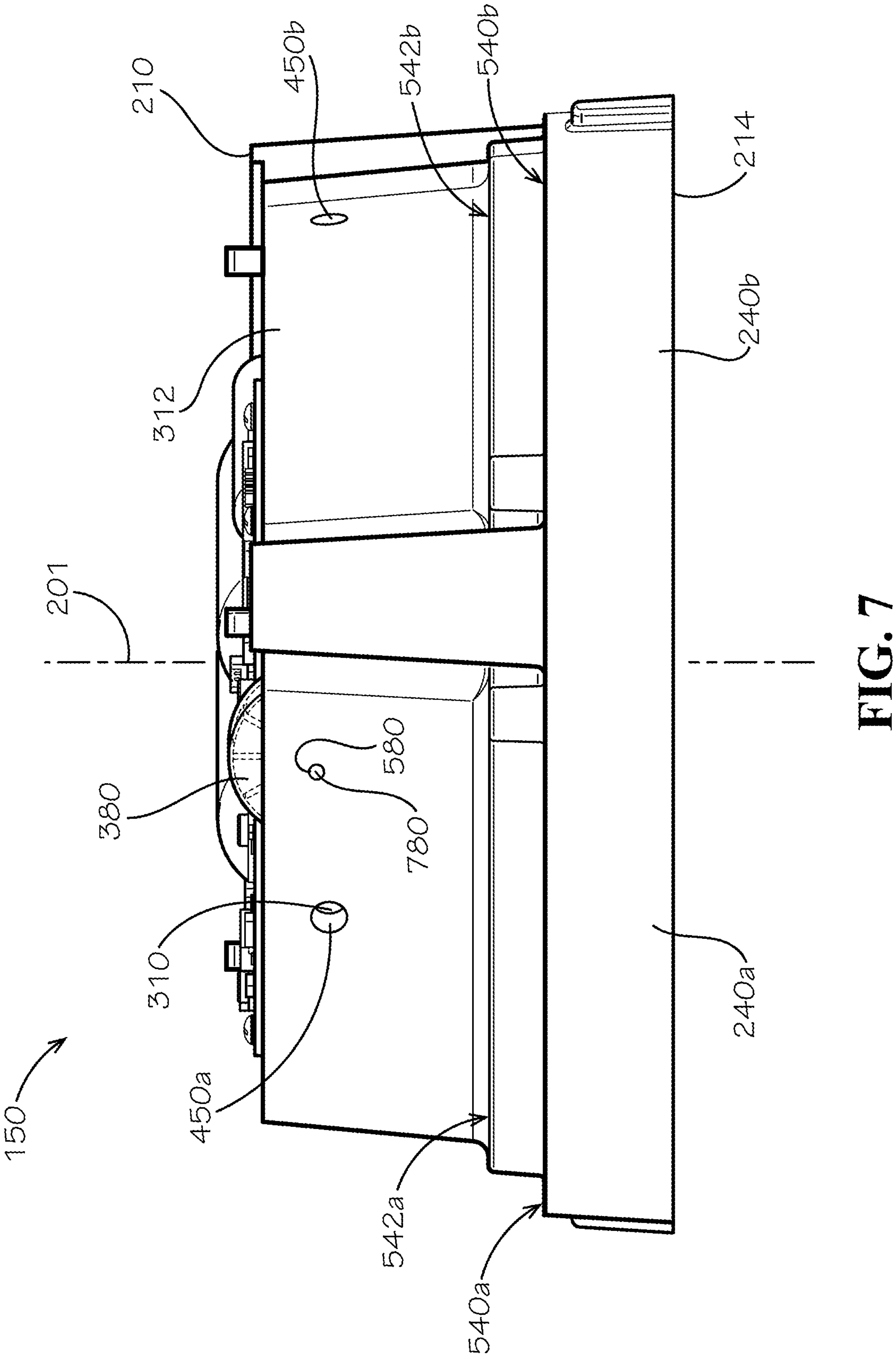
FIG. 7 is a side view of the nozzle cap of FIG. 1, as configured in FIG. 6.

FIG. 6 is a front perspective view of the nozzle cap 150 of FIG. 1, and FIG. 7 is a side view of the nozzle cap 150 of FIG. 1, each shown with the cap cover 280 (shown in FIG. 2), the cavity gasket 314 (shown in FIG. 3), the antenna PCB strips 320*a,b* (shown in FIG. 3), the spacer strips 326*a,b* (shown in FIG. 3), the plugs 452*a*—c (plugs 452*a,b* shown in FIG. 4, plug 452*c* shown in FIG. 8), the pins 428*a*—d, and the antenna covers 318*a,b* (shown in FIG. 3) removed. With the pins 428*a*—d removed, the pin holes 528*b*—d are shown exposed in FIG. 6. As previously described, the pin holes 528*b*—d can extend axially downwards, relative to the cap axis 201, into the respective bottom shelves 240*a,b* of the cap body 210 from the upper shelf surfaces 542*a,b* towards the second body end 214. In other aspects, the pin holes 528*b*—d can extend axially downwards into the respective bottom shelves 240*a,b* of the cap body 210 from the lower shelf surfaces 540*a,b* towards the second body end 214. In other aspects, the pin holes 528*b*—d can be threaded, and the pins 428*a*—d can be replaced by fasteners, such as screws or bolts, which can secure the antenna covers 318*a,b* to the cap body 210. With the plugs 452*a*—c removed, the wire ports 450*a*—c (wire port 450*c* and plug 452*c* shown in FIG.

8) can be open and unobstructed. As demonstrated by wire port 450*a* in FIG. 7, each of the wire ports 450*a*—c can extend through the circumferential wall 312 to the cavity 310. As further shown in FIG. 7, the threaded bore 580 can extend through the circumferential wall 312, and the threaded bore 580 can receive the threaded end 780 of the vibration sensor 380 to secure the vibration sensor 380 to the circumferential wall 312.

Figure 8:
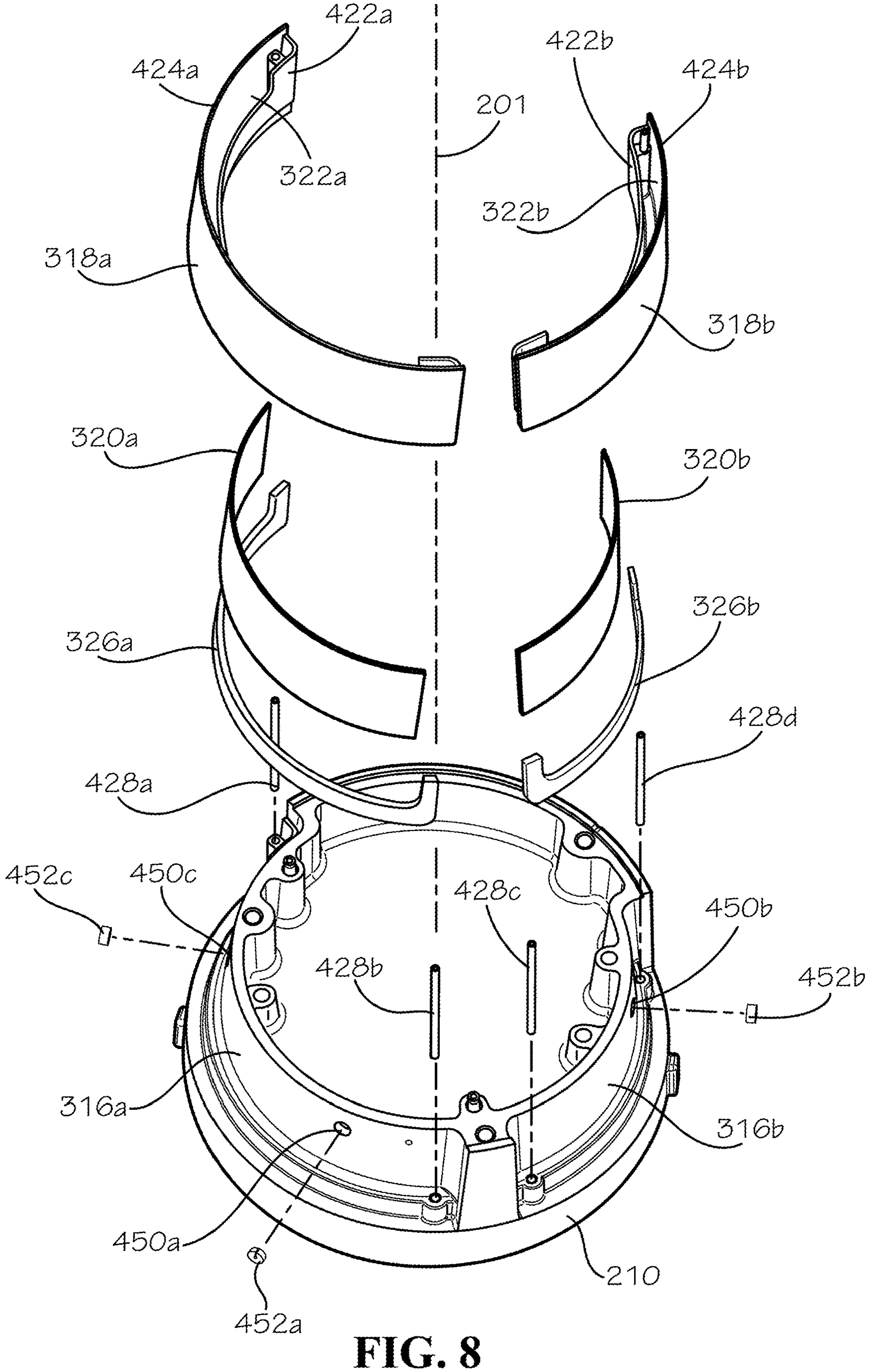
FIG. 8 is a front exploded view of the cap body, the plugs, the pins, the spacer strips, the antenna PCB strips, and the antenna covers of the nozzle cap of FIG. 1.
Figure 9:
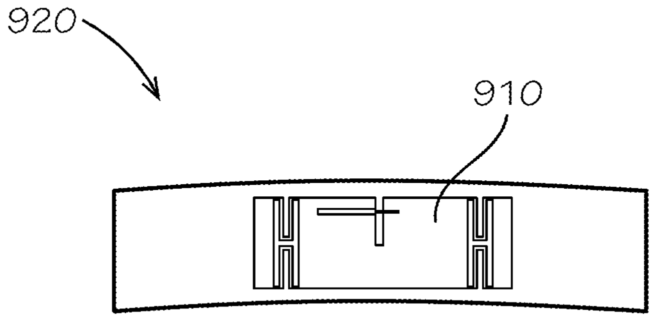
FIG. 9 is a front view of an antenna PCB strip comprising a Global System for Mobile communications ("GSM") antenna according to another aspect of the present disclosure.
Figure 10:
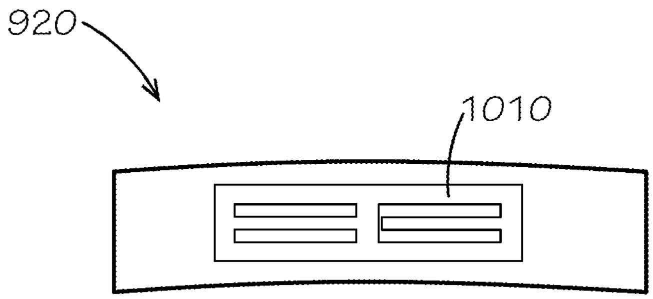
FIG. 10 is a front view of an antenna PCB strip comprising an Advanced Meter Infrastructure ("AMI") antenna according to another aspect of the present disclosure.
Figure 11:
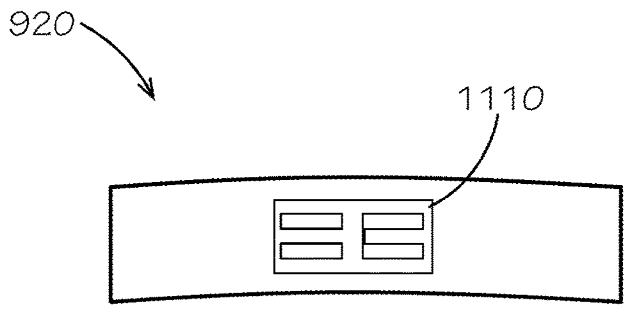
FIG. 11 is a front view of an antenna PCB strip comprising a Global Positioning System ("GPS") antenna according to another aspect of the present disclosure.
Figure 12:
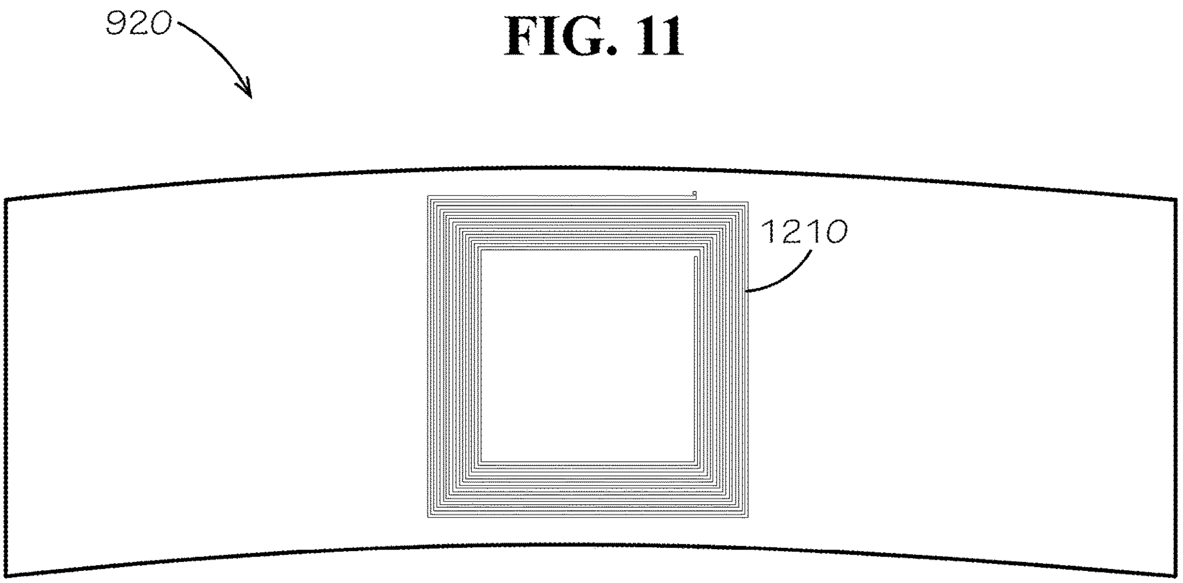
FIG. 12 is a front view of an antenna PCB strip comprising a Near Field Communication ("NFC") antenna according to another aspect of the present disclosure.

FIG. 8 is a front exploded view of the cap body 210, the plugs 452*a*—c, the pins 428*a*—d, the spacer strips 326*a,b*, the antenna PCB strips 320*a,b*, and the antenna covers 318*a,b* of the aspect of FIG. 2. The cap body 210, the pins 428*a*—d, the spacer strips 326*a,b*, and the antenna PCB strips 320*a,b* can be translated along the cap axis 201. The plugs 452*a*—c can be translated radially outward from their respective wire ports 450*a*—c relative to the cap axis 201. The coaxial cable feedlines for the antenna PCB strips 320*a,b* are not shown.

As previously described and demonstrated by the inner layer 422*a* of the antenna cover 318*a*, the inner layers 422*a,b* can be shaped complimentarily to the respective spacer strips 326*a,b*. Additionally, circumferential lengths of the antenna covers 318*a,b*, spacer strips 326*a,b*, and antenna PCB strips 320*a,b* can correspond to the circumferential length of the respective external scallop 316*a,b*. In the present aspects, the external scallop 316*a*, the antenna cover 318*a*, the antenna PCB strip 320*a*, and the spacer strip 326*a* can each define a longer circumferential length than the respective external scallop 316*b*, the antenna cover 318*b*, the antenna PCB strip 320*b*, and the spacer strip 326*b*. In other aspects, the external scallops 316*a,b*, the antenna covers 318*a,b*, the antenna PCB strips 320*a,b*, and the spacer strip 326*a,b* can be equal in circumferential length.

As previously described, the antenna PCB strips 320*a,b* can be configured to attach to the inner cover surfaces 322*a,b* within the respective covers 318*a,b* and between the respective inner layers 422*a,b* and outer layers 424*a,b*. The antenna PCB strips 320*a,b* can be flexible PCBs, and when the antenna PCB strips 320*a,b* are attached to the inner cover surfaces 322*a,b*, each antenna PCB strip 320*a,b* can be shaped as a frustum section. In other aspects, the antenna PCB strips 320*a,b* can be shaped as cylindrical sections when attached to the inner cover surfaces 322*a,b*.

The antenna PCB strips 320*a,b* can each comprise one or more antennas, as shown and further discussed below with respect to FIGS. 9-12. For example and without limitation, antenna PCB strip 320*a* can comprise two separate antennas, and a wire (shown in FIG. 4) attached to the first antenna can extend through the wire port 450*a* while a wire (shown in FIG. 4) attached to the second antenna can extend through the wire port 450*c* to attach the antenna PCB strip in electrical communication with the processing PCB 362 (shown in FIG. 3). Antenna PCB strip 320*b* can comprise a third antenna with a wire (shown in FIG. 4) extending through the wire port 450*b* to attach the antenna PCB strip in electrical communication with the processing PCB 362. In the present aspect, the antennas can be different types of antennas configured to wirelessly transmit over different frequency ranges. By separating the antenna PCB strips 320*a,b* into the separate external scallops 316*a,b*, interference between the antennas of the antenna PCB strips 320*a,b* can be reduced. By reducing interference, the separate antenna PCB strips 320*a,b* can offer improved performance in range and signal clarity. In other aspects, the nozzle cap 150 can comprise more than two antenna PCB strips 320*a,b*, and the cap body 210 can define more than two external scallops 316*a,b*.

FIGS. 9-12 show front views of variations of an antenna PCB strip 920 which can be representative of either or both of the antenna PCB strips 320*a,b*. In the aspects shown, the antenna PCB strips 920 can each comprise one antenna 910,1010,1110,1210 which can be printed on the antenna PCB strip 920. In the present aspect, the antenna PCB strips 920 can be flexible PCBs. In the aspect shown in FIG. 9, the antenna 910 can be a Global System for Mobile communication ("GSM") antenna configured to wirelessly transmit a signal over GSM frequency bands. In the aspect shown in FIG. 10, the antenna 1010 can be an Advanced Metering Infrastructure ("AMI") antenna configured to wirelessly transmit a signal over AMI frequency bands. In the aspect shown in FIG. 11, the antenna 1110 can be a Global Positioning System ("GPS") antenna configured to wirelessly transmit a signal over GPS frequency bands. In the aspect shown in FIG. 12, the antenna 1210 can be a Near Field Communication ("NFC") antenna configured to wirelessly transmit a signal over NFC frequency bands. In other aspects, the antenna PCB strip 920 can comprise one or more antennas configured to wirelessly transmit over any frequency band or range.

The antenna PCB strips 920 can define an arched shape in the present aspect; and the antenna PCB strips 920 can be curved to conform to a curvature of the inner cover surfaces 322*a,b* (shown in FIG. 8). Once secured to the inner cover surfaces 322*a,b*, the antenna PCB strips 920 can take the shape of a frustum section wherein the bottom edge and the top edge can lie in substantially parallel planes. When installed, the bottom edge can lie flat against the respective bottom cover surfaces 333*a,b* (shown in FIG. 3) in the present aspect.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method for manufacturing a nozzle cap, the method comprising:

obtaining a cap body configured to seal a nozzle;

attaching an antenna printed circuit board ("PCB") strip to an inner cover surface of an antenna cover;

inserting the antenna cover into a scallop defined by an outer wall surface of a circumferential wall extending about a circumference of a cap body to position the antenna PCB strip between the antenna cover and the circumferential wall, the circumferential wall defining the outer wall surface, the antenna cover covering the scallop, the scallop extending radially inward into the outer wall surface of the circumferential wall relative to a first portion and a second portion of the outer wall surface, the scallop circumferentially positioned between the first portion and the second portion of the outer wall surface; and fastening the antenna cover to the cap body.

2. The method of claim 1, further comprising contacting the inner cover surface with a spacer strip positioned within the scallop.

3. The method of claim 1, wherein inserting the antenna cover into the scallop comprises positioning an outer cover surface of the antenna cover flush with the first portion and the second portion of the outer wall surface.

4. The method of claim 1, further comprising pinning the antenna cover to the cap body with at least one pin.

5. The method of claim 1, further comprising mounting a vibration sensor to the cap body.

6. The method of claim 1, further comprising filling an antenna cavity with potting, the antenna cavity defined between the inner cover surface and the circumferential wall, the antenna PCB strip positioned within the antenna cavity.

7. The method of claim 1, further comprising attaching a cap cover to the circumferential wall, the cap cover at least partially enclosing an antenna cavity, the antenna cavity defined between the inner cover surface and the circumferential wall, the antenna PCB strip positioned within the antenna cavity.

8. A nozzle cap comprising:

a cap nut configured to seal the nozzle cap on a nozzle;

a cap body defining a circumferential wall extending about a circumference of the cap body, the circumferential wall defining an outer wall surface, a scallop defined by the outer wall surface and extending into the outer wall surface of the circumferential wall relative to a first portion and a second portion of the outer wall surface, the scallop circumferentially positioned between the first portion and the second portion of the outer wall surface;

an antenna cover positioned within the scallop, the antenna cover secured to the cap body by at least one pin; and an antenna printed circuit board ("PCB") strip positioned within an antenna cavity defined between the antenna cover and the circumferential wall.

9. The nozzle cap of claim 8, wherein the cap body defines at least one pin hole, and wherein the at least one pin hole receives the at least one pin.

10. The nozzle cap of claim 8, further comprising a cap cover coupled to the circumferential wall, the cap cover at least partially enclosing the antenna cavity.

11. The nozzle cap of claim 8, wherein the antenna PCB strip is coupled to an inner cover surface of the antenna cover.

12. The nozzle cap of claim 8, further comprising a spacer strip positioned between the antenna cover and the circumferential wall.

13. The nozzle cap of claim 8, further comprising a second antenna cover and a second antenna PCB strip each positioned within a second scallop defined by the circumferential wall.

14. The nozzle cap of claim 8, further comprising a vibration sensor coupled to the cap body.

15. A method for manufacturing a nozzle cap, the method comprising:

obtaining a cap body configured to seal a nozzle;

positioning a first antenna cover in a first scallop defined by an outer wall surface of a circumferential wall extending about a circumference of the cap body with a first antenna printed circuit board ("PCB") strip positioned between the first antenna cover and the circumferential wall, the circumferential wall defining the outer wall surface, the first scallop extending inwards into the outer wall surface relative to a first portion and a second portion of the outer wall surface, the first scallop circumferentially positioned between the first portion and the second portion of the outer wall surface; and positioning a second antenna cover in a second scallop of the circumferential wall with a second antenna PCB strip positioned between the second antenna cover and the circumferential wall.

16. The method of claim 15, wherein an outer cover surface of the first antenna cover is positioned flush with the first portion and the second portion of the outer wall surface.

17. The method of claim 15, further comprising attaching a cap cover to the circumferential wall.

18. The method of claim 17, wherein attaching the cap cover to the circumferential wall comprises at least partially enclosing a first antenna cavity and a second antenna cavity, the first antenna cavity defined between the first antenna cover and the circumferential wall, the second antenna cavity defined between the second antenna cover and the circumferential wall.

19. The method of claim 15, further comprising attaching a vibration sensor to the cap body.

20. The method of claim 15, further comprising positioning a potting material between the first antenna cover and the circumferential wall.

* * * * *